United States Patent
Lam et al.

(10) Patent No.: US 12,282,182 B2
(45) Date of Patent: Apr. 22, 2025

(54) REFLECTOR ORIENTATION OF GEOMETRICAL AND MIXED WAVEGUIDE FOR REDUCING GRATING CONSPICUITY FOR NEAR-EYE DISPLAYS

(71) Applicant: Meta Platforms Technologies, LLC, Menlo Park, CA (US)

(72) Inventors: Wai Sze Tiffany Lam, Lynnwood, WA (US); Wanli Chi, Sammamish, WA (US); Yang Yang, Redmond, WA (US); Dominic Meiser, Bothell, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 145 days.

(21) Appl. No.: 18/063,913

(22) Filed: Dec. 9, 2022

(65) Prior Publication Data
US 2024/0192427 A1    Jun. 13, 2024

(51) Int. Cl.
*F21V 8/00* (2006.01)
*G02B 27/01* (2006.01)
*G06F 1/16* (2006.01)

(52) U.S. Cl.
CPC ......... *G02B 6/0035* (2013.01); *G02B 6/0016* (2013.01); *G02B 27/0172* (2013.01);
(Continued)

(58) Field of Classification Search
CPC ................ G02B 6/0035; G02B 6/0016; G02B 27/0172; G02B 27/0081;
(Continued)

(56) References Cited

U.S. PATENT DOCUMENTS 6,285,813 B1    9/2001  Schultz et al.
10,444,511 B2 * 10/2019  Kim .................... G02B 27/0172
(Continued)

FOREIGN PATENT DOCUMENTS

CN           113625386 A    11/2021
WO     WO-2020146451 A1    7/2020

OTHER PUBLICATIONS

FDTD: "Understanding Direction Unit vector Coordinates in Far Field Projections," Ansys/Lumerical, 2021, 2 pages.
(Continued)

*Primary Examiner* — Andrew Jordan
(74) *Attorney, Agent, or Firm* — Weaver Austin Villeneuve & Sampson LLP

(57) ABSTRACT

A waveguide display system include a waveguide, an input coupler configured to couple display light into the waveguide, a first pupil expander, and a second pupil expander. The first pupil expander is configured to deflect, at a first plurality of locations along a first direction, the display light towards the second pupil expander. The second pupil expander is configured to deflect, at a second plurality of locations along a second direction different from the first direction, the display light from the first pupil expander towards an eyebox of the waveguide display system. At least one of the input coupler, the first pupil expander, or the second pupil expander includes transflective mirrors that are tilted within the waveguide such that the transflective mirrors are inconspicuous when viewed from an oblique angle.

17 Claims, 14 Drawing Sheets

(52) U.S. Cl.
CPC ...... *G06F 1/163* (2013.01); *G02B 2027/0123* (2013.01); *G02B 2027/0178* (2013.01)

(58) Field of Classification Search
CPC .... G02B 2027/0123; G02B 2027/0178; G02B 2027/0125; G06F 1/163
See application file for complete search history.

(56) References Cited

U.S. PATENT DOCUMENTS

| | | | |
|---|---|---|---|
| 10,598,938 B1 | 3/2020 | Huang et al. | |
| 10,845,596 B2 | 11/2020 | Lee et al. | |
| 11,099,390 B2* | 8/2021 | Kim | G06T 19/006 |
| 11,125,993 B2* | 9/2021 | Pennell | G02B 6/005 |
| 11,624,926 B1 | 4/2023 | Lam et al. | |
| 11,668,930 B1* | 6/2023 | Pennell | G02B 27/141 |
| | | | 359/633 |
| 12,085,717 B2 | 9/2024 | Lam et al. | |
| 2018/0136467 A1* | 5/2018 | Kim | G06F 3/011 |
| 2019/0391397 A1* | 12/2019 | Kim | G06T 19/006 |
| 2020/0076152 A1 | 3/2020 | Eichenholz et al. | |
| 2020/0117005 A1 | 4/2020 | Chi et al. | |
| 2020/0183152 A1* | 6/2020 | Pennell | G02B 27/141 |
| 2020/0257065 A1 | 8/2020 | Chi et al. | |
| 2020/0356050 A1 | 11/2020 | Lane et al. | |
| 2021/0055555 A1 | 2/2021 | Chi et al. | |
| 2021/0080721 A1 | 3/2021 | Geng et al. | |
| 2021/0223548 A1 | 7/2021 | Maimone et al. | |
| 2021/0223549 A1 | 7/2021 | Maimone et al. | |
| 2021/0278669 A1 | 9/2021 | Fabien et al. | |
| 2021/0364833 A1 | 11/2021 | Geng et al. | |
| 2022/0035159 A1 | 2/2022 | Koshelev et al. | |
| 2022/0128746 A1 | 4/2022 | Chi et al. | |
| 2023/0088953 A1* | 3/2023 | Smeeton | G02B 27/0172 |
| | | | 359/13 |
| 2023/0133264 A1 | 5/2023 | Amirsolaimani et al. | |
| 2023/0204959 A1 | 6/2023 | Yang et al. | |
| 2023/0204967 A1 | 6/2023 | Yang et al. | |
| 2023/0209032 A1 | 6/2023 | Yang et al. | |
| 2023/0213761 A1 | 7/2023 | Lam et al. | |
| 2023/0408826 A1* | 12/2023 | Oh | G02F 1/1368 |
| 2024/0069340 A1* | 2/2024 | Krawczyk | G02B 27/0101 |
| 2024/0168299 A1* | 5/2024 | Tu | G02B 27/0172 |
| 2024/0192427 A1* | 6/2024 | Lam | G02B 6/0016 |
| 2024/0231103 A1* | 7/2024 | Xu | G02B 27/0172 |

OTHER PUBLICATIONS

International Search Report and Written Opinion for International Application No. PCT/US2023/013082, mailed Jun. 14, 2023, 10 pages.

* cited by examiner

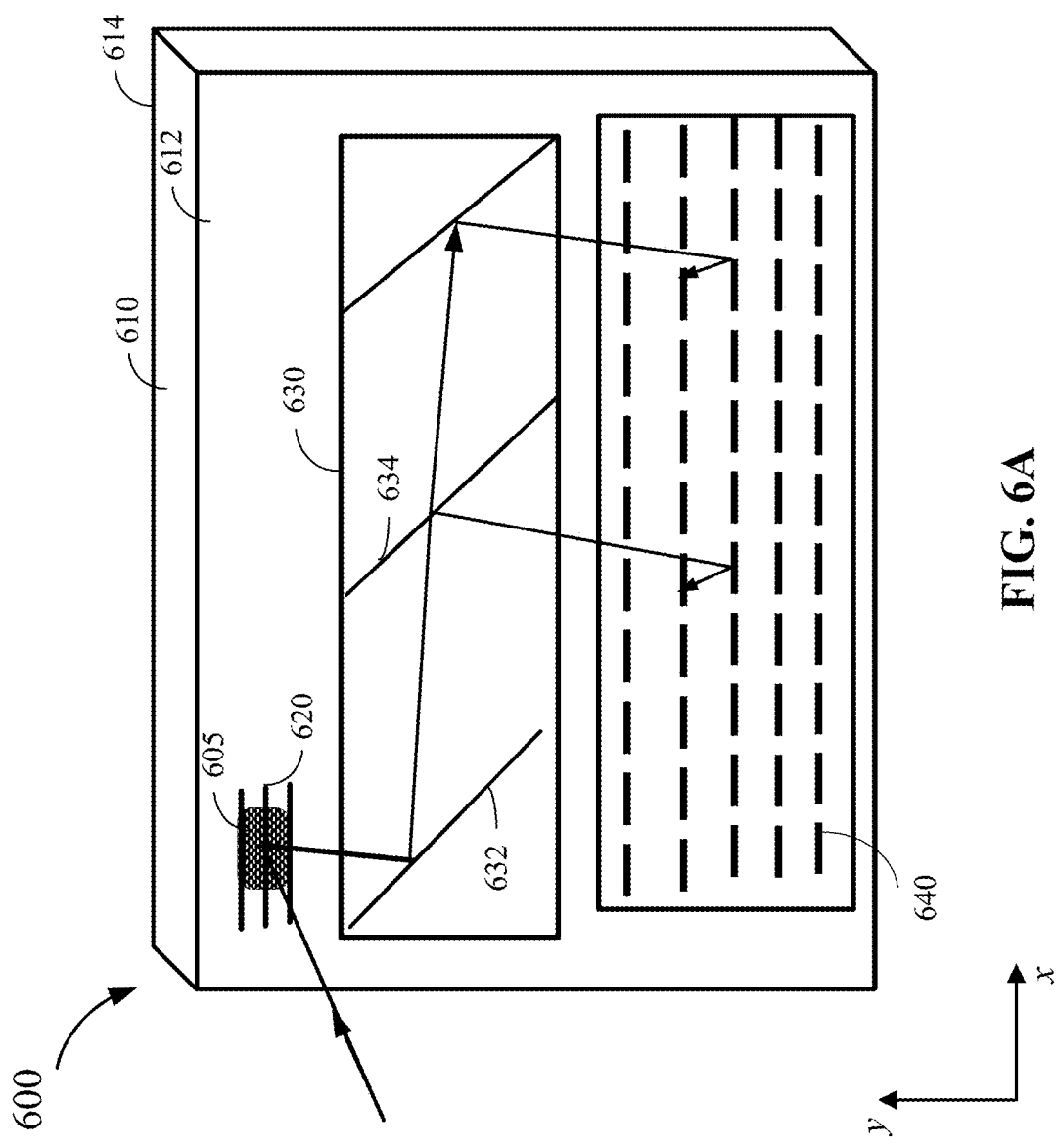

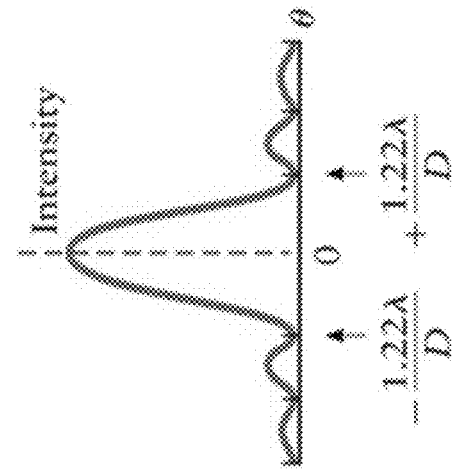
FIG. 11B
FIG. 11C
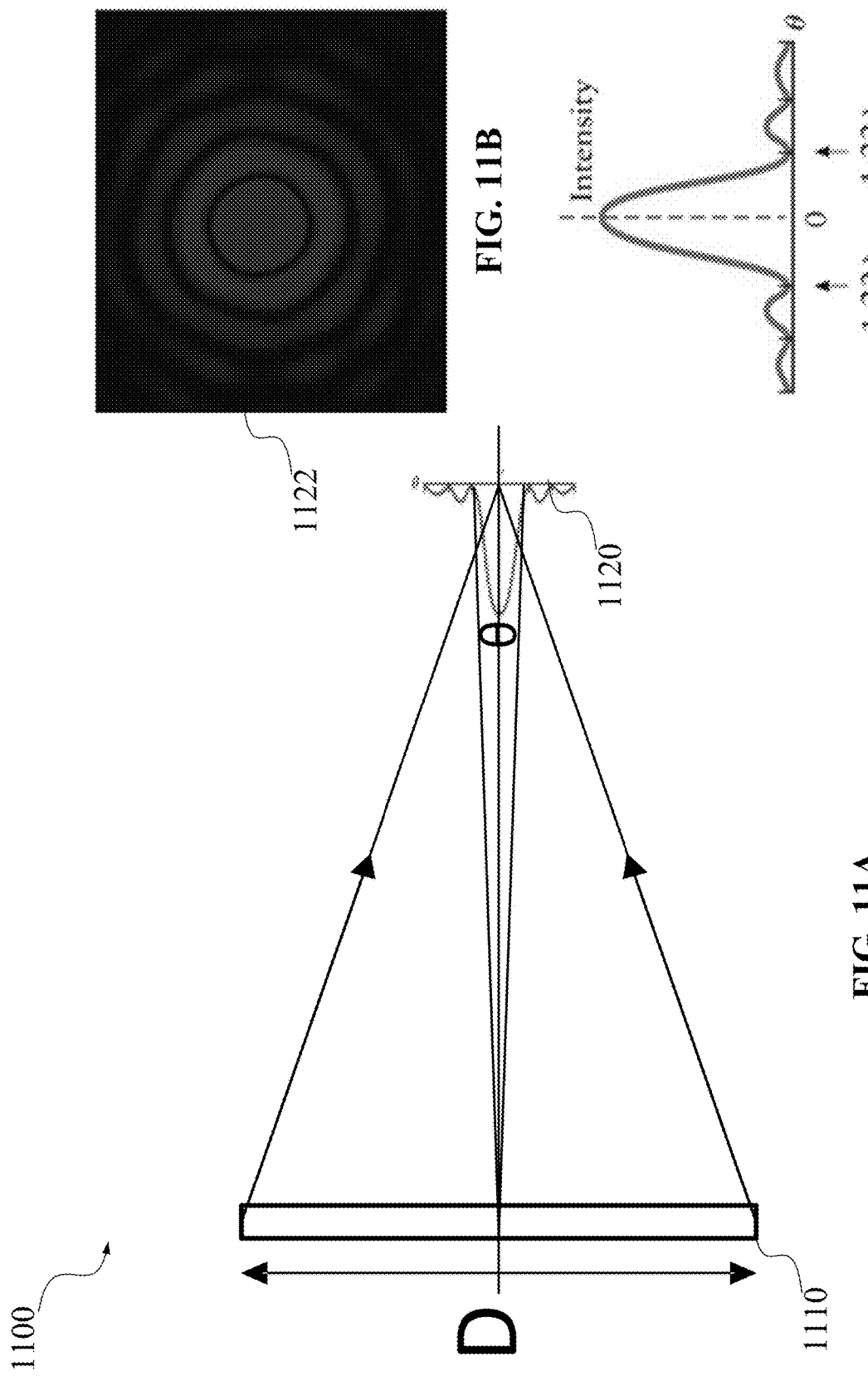
FIG. 11A

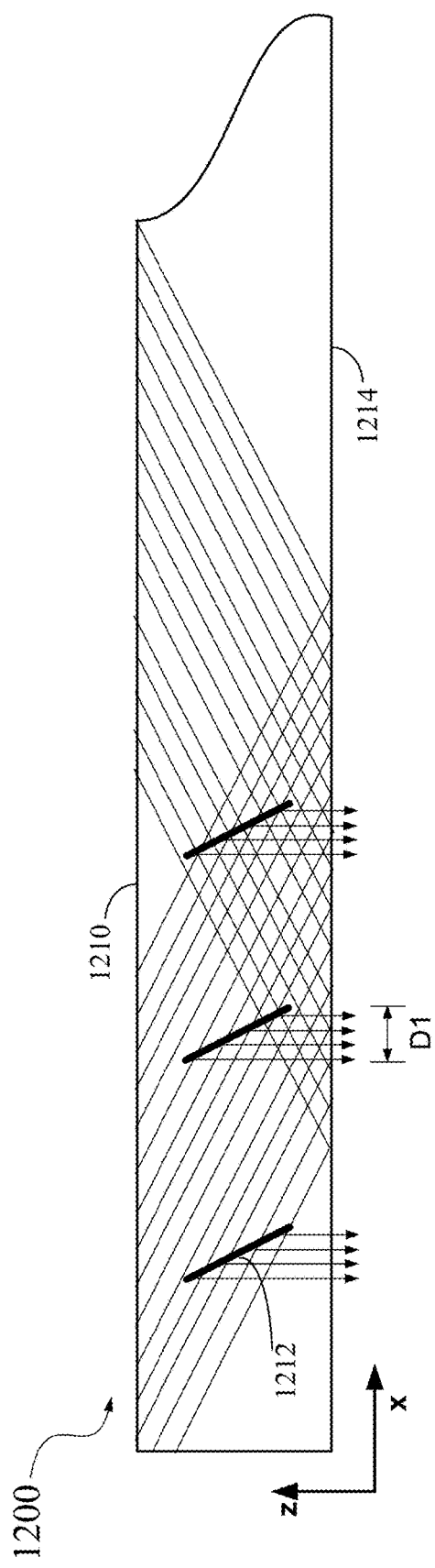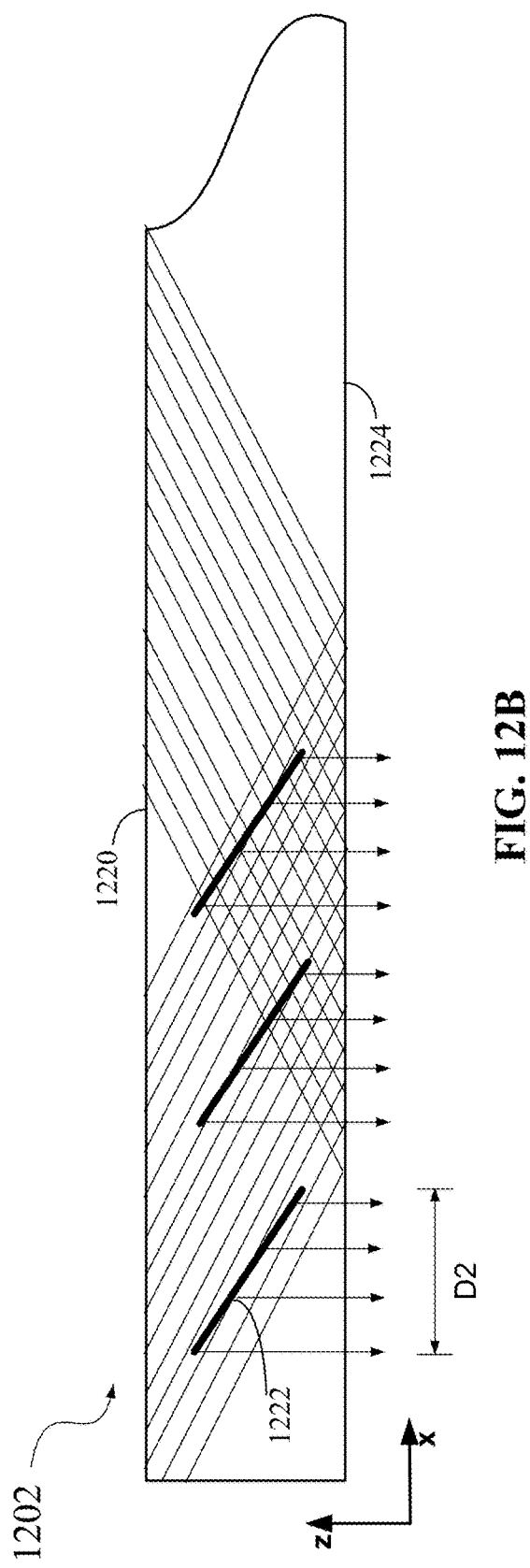
FIG. 12A
FIG. 12B

REFLECTOR ORIENTATION OF GEOMETRICAL AND MIXED WAVEGUIDE FOR REDUCING GRATING CONSPICUITY FOR NEAR-EYE DISPLAYS

BACKGROUND

An artificial reality system, such as a head-mounted display (HMD) or heads-up display (HUD) system, generally includes a near-eye display (e.g., in the form of a headset or a pair of glasses) configured to present content to a user via an electronic or optic display within, for example, about 12-20 mm in front of the user's eyes. The near-eye display may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)), and the surrounding environment by, for example, seeing through transparent display glasses or lenses (often referred to as optical see-through).

One example of an optical see-through AR system may use a waveguide-based optical display, where light of projected images may be coupled into a waveguide (e.g., a transparent substrate), propagate within the waveguide, and be coupled out of the waveguide at different locations. In some implementations, the light of the projected images may be coupled into or out of the waveguide using diffractive optical elements, such as surface-relief gratings or volume Bragg gratings. Light from the surrounding environment may pass through a see-through region of the waveguide and reach the user's eyes as well.

SUMMARY

This disclosure relates generally to near-eye display systems. More specifically, techniques disclosed herein relates to waveguide-based near-eye display systems including partially reflective mirrors for pupil expansion. Various inventive embodiments are described herein, including devices, components, systems, modules, subsystems, and the like.

According to certain embodiments, a waveguide display system may include a waveguide, an input coupler configured to couple display light into the waveguide, a first pupil expander, and a second pupil expander. The first pupil expander may be configured to deflect, at a first plurality of locations along a first direction, the display light towards the second pupil expander. The second pupil expander may be configured to deflect, at a second plurality of locations along a second direction different from the first direction, the display light from the first pupil expander towards an eyebox of the waveguide display system. At least one of the first pupil expander or the second pupil expander may include transflective mirrors that are tilted within the waveguide such that the transflective mirrors are inconspicuous when viewed from an oblique angle.

In some embodiments of the waveguide display system, the first pupil expander may include transflective mirrors that are tilted within the waveguide at an angle between 40° and 60° with respect to a broadside surface of the waveguide. In some embodiments, the second pupil expander may include transflective mirrors that are tilted within the waveguide at an angle between 25° and 35° with respect to a broadside surface of the waveguide. In some embodiments, the transflective mirrors may be characterized by different respective reflection efficiencies. In some embodiments, at least one of the input coupler, the first pupil expander, or the second pupil expander may include multiplexed volume Bragg gratings, where the multiplexed volume Bragg gratings may include reflective diffraction gratings or transmissive diffraction gratings.

In some embodiments of the waveguide display system, the input coupler may include a volume Bragg grating, a surface-relief grating, a prism, or a reflective surface. Each transflective mirror of the transflective mirrors may include a plurality of dielectric coating layers. In some embodiments, a width of a light beam reflected by each transflective mirror of the transflective mirrors may be larger than a half of a thickness of the waveguide. In some embodiments, each transflective mirror of the transflective mirrors may be characterized by a full-width half-magnitude (FWHM) reflection angular range greater than 40°. In some embodiments, at least one transflective mirror of the transflective mirrors is characterized by a reflectivity greater than 50%.

In some embodiments of the waveguide display system, the input coupler may include a first volume Bragg grating characterized by a first grating vector, the second pupil expander may include a second volume Bragg grating characterized by a second grating vector, and the first grating vector and the second grating vector may have a same component in a plane parallel to a broadside surface of the waveguide. The first pupil expander and the second pupil expander may at least partially overlap when viewed in a surface normal direction of the waveguide. In some embodiments, the waveguide display system may include a deflector configured to deflect the display light from the input coupler towards the first pupil expander. In some embodiments, the deflector may include a first group of one or more reflective and/or transflective mirrors having a first orientation, and the first pupil expander may include a second group of one or more reflective and/or transflective mirrors having the first orientation. In some embodiments, the input coupler may include a first group of one or more reflective and/or transflective mirrors having a first orientation, and the second pupil expander may include a second group of one or more reflective and/or transflective mirrors having the first orientation.

According to certain embodiments, a near-eye display system may include an image source configured to emit display light of images, a waveguide transparent to visible light, display optics configured to project the display light onto the waveguide, an input coupler configured to couple the display light into the waveguide, a first pupil expander configured to split the display light at a first plurality of locations along a first direction, and a second pupil expander configured to split the display light from each location of the first plurality of locations of the first pupil expander at a second plurality of locations along a second direction that is different from the first direction. At least one of the first pupil expander or the second pupil expander includes transflective mirrors that are tilted within the waveguide such that the transflective mirrors are inconspicuous when viewed from an oblique angle.

In some embodiments of the near-eye display system, the first pupil expander may include transflective mirrors that are tilted within the waveguide at an angle between 40° and 60° with respect to a broadside surface of the waveguide, and the second pupil expander may include transflective mirrors that are tilted within the waveguide at an angle between 25° and 35° with respect to the broadside surface of the waveguide. In some embodiments, the transflective mirrors may be characterized by different respective reflection efficiencies, and a width of a light beam reflected by each transflective mirror of the transflective mirrors may be larger than a half of a thickness of the waveguide.

According to certain embodiments, a near-eye display system may include a waveguide transparent to display light, an input coupler configured to couple the display light into the waveguide and including a first group of one or more reflective and/or transflective mirrors having a first orientation, a first pupil expander, and a second pupil expander. The first pupil expander may be configured to deflect, at a first plurality of locations along a first direction, the display light from the input coupler towards the second pupil expander, the first pupil expander including a second group of one or more reflective and/or transflective mirrors having a second orientation. The second pupil expander may be configured to deflect, at a second plurality of locations along a second direction different from the first direction, the display light from the first pupil expander towards an eyebox of the near-eye display system, the second pupil expander including a third group of one or more reflective and/or transflective mirrors having the first orientation.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 6A illustrates an example of a waveguide display system including a waveguide and diffraction gratings for exit pupil expansion.

FIG. 6B illustrates an example of an eyebox including two-dimensional replicated exit pupils.

FIGS. 11A-11C show the relationship between the optical resolution and the size of the optical aperture (or input beam width) of an imaging system.

FIG. 12A illustrates an example of a pupil expander in the form of a geometrical waveguide that includes a set of transflective mirrors within a waveguide.

FIG. 12B illustrates another example of a pupil expander in the form of a geometrical waveguide that includes a set of transflective mirrors within a waveguide according to certain embodiments.

Figure 1:
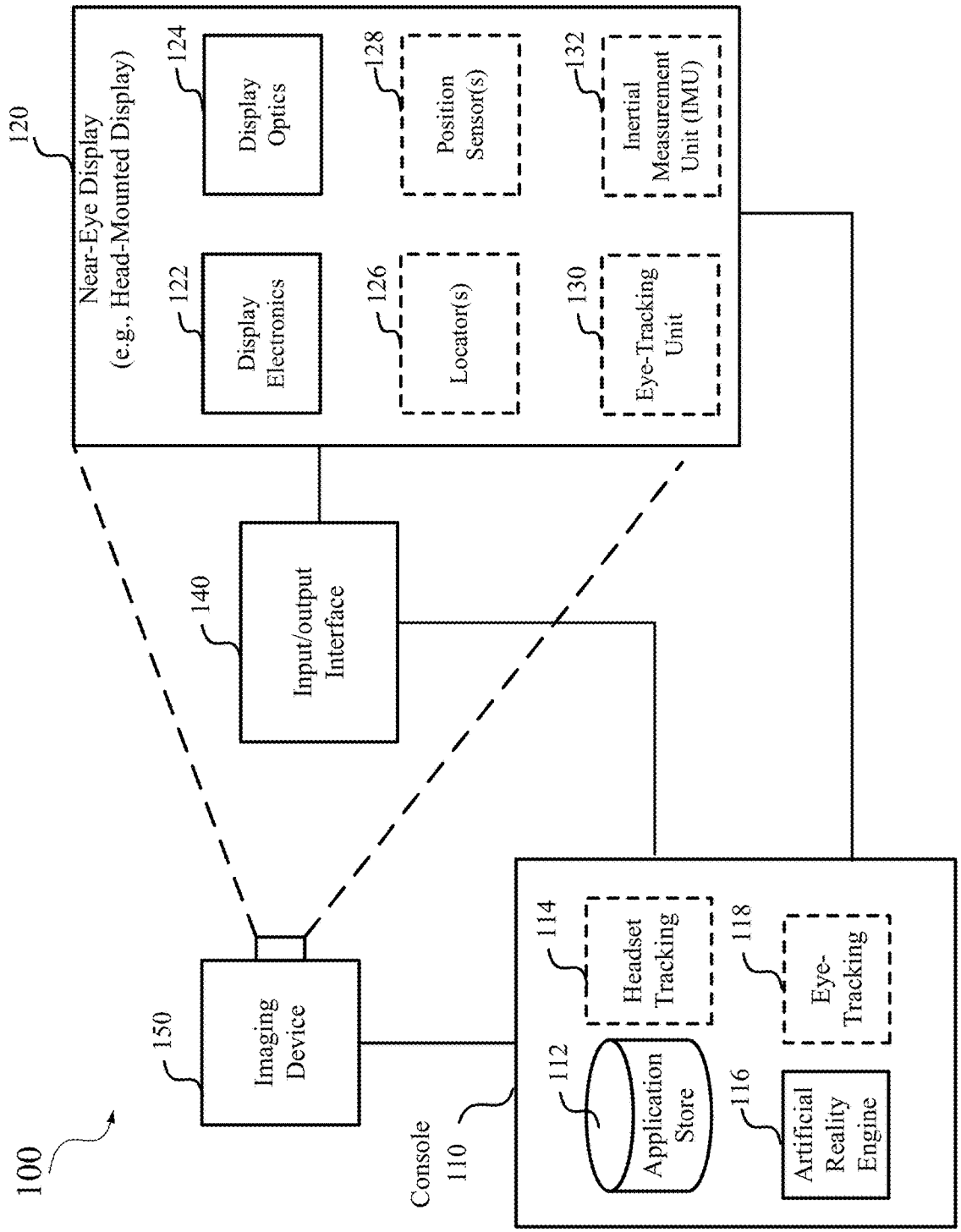
FIG. 1 is a simplified block diagram of an example of an artificial reality system environment including a near-eye display according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This disclosure relates generally to near-eye display systems. More specifically, techniques disclosed herein relates to waveguide-based near-eye display systems including partially reflective mirrors for pupil expansion. Various inventive embodiments are described herein, including devices, components, systems, modules, subsystems, and the like.

Optical see-through near-eye display systems that employ waveguides and diffraction gratings (e.g., volume Bragg gratings (VBGs)) to present display images from a projector to user's eyes may have limited field of view (FOV) and spectrum coverage, due to, for example, limited angular and spectral bandwidth of the diffraction gratings. Some diffraction gratings such as VBGs may have also limited diffraction efficiencies. In addition, multiple gratings used for one-dimensional or two-dimensional pupil expansion may perform multiple times of optical filtering (e.g., Bragg filtering due to limited bandwidths of the VBGs) on the display images, which may lead to optical artifacts such as intercepting optical line patterns that may reduce the quality of the display images.

In some implementations, an optical see-through near-eye display system may include a waveguide with one or more arrays of partially reflective mirrors embedded in multiple locations of the waveguide to direct display images from the multiple locations to user's eyes, thereby replicating the exit pupil and expanding the eyebox in one or two dimensions. The partially reflective mirrors may also be referred to as transflective mirrors, geometric mirrors, or geometric reflectors. A waveguide including transflective mirrors in the waveguide may be referred to as a geometrical waveguide. A transflective mirror may split incident light by partially reflecting incident light and partially transmitting the incident light such that a portion of the incident light may continue to propagate within the waveguide to be split by other transflective mirrors. Such near-eye display systems may be referred to as geometrical waveguide display systems.

A conventional geometrical waveguide display may use a prism (as the input coupler) and two groups of geometrical reflectors to guide and expand display light to an eyebox. The prism may induce color dispersion that may often be difficult to fully compensate by partial reflective mirrors and the substrate along the light path. According to certain embodiments disclosed herein, a geometrical waveguide display may include 3 or 4 groups of geometrical reflectors to achieve full and complete color dispersion compensation, where the display light may interact with both input mirrors and output mirrors that have the same mirror orientations, and may interact with both a first group of middle mirrors and a second group of middle mirrors (or different regions of a same group of middle mirrors) that may have the same mirror orientations. The combination of multiple groups of mirrors can produce close to zero dispersion from waveguide input to waveguide output and the eyebox for visible light (e.g., red, green, and blue light) from all angles. The input mirror(s) may include a single mirror with reflectivity close to 100%, or a group of mirrors including one mirror with reflectivity close to 100% and one or more transflective mirrors with reflectivity less than 100%.

In some implementations, a near-eye display system may include a waveguide display that may include both diffraction gratings (e.g., VBGs) and transflective mirrors for two-dimensional pupil expansion. For example, either the VBGs or the transflective mirrors may be used to deflect, at multiple locations along a first direction, the display light from an input coupler (e.g., a prism, grating, or slanted mirror) towards a second direction to expand the pupil in one dimension (e.g., the first direction). Such VBGs or transflective mirrors may be referred to herein as the middle grating (or a first output grating). Display light deflected at multiple locations by the middle grating towards the second direction may reach an output grating, which may include either VBGs or transflective mirrors and may deflect an incident display light beam at multiple locations along the second direction towards an eye box of the near-eye display system, thereby expanding the pupil in a second dimension (e.g., the second direction). Such waveguide display systems may be referred to herein as hybrid waveguide display systems. The combination of diffraction gratings and partial reflective mirrors may lead to a hybrid spectral and angular coverage that may be broader than that of VBG-based waveguide display systems. This may lead to an improvement of the FOV and a reduction of undesired optical artifacts such as ghost images and intercepting optical line patterns.

In either geometrical waveguide display systems or hybrid waveguide display systems, when the transflective mirrors are used as the middle grating for pupil expansion in a first dimension, the transflective mirrors may generally be positioned at an angle close to 90° with respect to a broadside surface of the waveguide (e.g., approximately perpendicular to the broadside surface). Such orientations of the transflective mirrors may make the transflective mirrors conspicuous to a person in front of the user because, when the person views the near-eye display system from an oblique angle, there may be a large transmissivity contrast between the partially reflective regions (the transflective mirrors) and regions between the partially reflective regions, which may lead to the person's eye perceiving conspicuous structures (e.g., stripes). For waveguide display systems, it is generally desirable that the optical gratings and other optical structures within or on the waveguides be as inconspicuous as possible. In addition, such orientations of the transflective mirrors may also decrease the optical resolution of the waveguide display systems because the sizes of the light beams reflected by the transflective mirrors may be small and thus the minimum spot size of the images on the image plane may be large.

According to certain embodiments, transflective mirrors used in the middle grating of a near-eye display system, such as a geometrical waveguide display system or a hybrid waveguide display system, may be tilted at a certain angle (e.g., within about 40-60°) with respect to a broadside surface of the waveguide. In this way, a person viewing the near-eye display system from different angles may mostly view the partially reflective regions (rather than high-transmittance gaps between the transflective mirrors), and thus may perceive a low transmissivity contrast. As such, the transflective mirrors may not be conspicuous to the person. In addition, when the transflective mirrors of the middle grating are tilted from the surface-normal direction of the broadside surface of the waveguide, the sizes of the light beams reflected by the transflective mirrors may be large, and thus the effective optical aperture of the display system may be larger and the optical resolution of the display system may be higher.

In one example, a waveguide display system may include an input coupler (e.g., a prism, a grating, or a slanted mirror), a middle light deflection structure (e.g., a middle grating or a first pupil expander including VBGs or an array of transflective mirrors), and an output light deflection structure (e.g., an output grating or a second pupil expander including VBGs or an array of transflective mirrors). The input coupler may couple display light from a projector into the waveguide. In some embodiments, the middle grating may include an array of transflective mirrors arranged along a first direction and tilted at an angle less that about 60° (e.g., about 45° or 50°) with respect to the broadside surface of the waveguide. Each transflective mirror of the array of transflective mirrors may deflect a portion of the incident display light to a second direction towards the output grating. The output grating may include an array of transflective mirrors or VBGs, and may, at each location of multiple locations along the second direction, direct a portion of an incident display light beam from the middle grating towards an eye box of the waveguide display system. In some embodiments, transflective mirrors may be used in the middle grating and may be tilted at an angle between about 40° and about 60° (e.g., about 45° or 50°) with respect to the broadside surface of the waveguide. In some embodiments, transflective mirrors may be used in the output grating and may be tilted at an angle between about 25° and about 35° with respect to the broadside surface of the waveguide.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display 120 in accordance with certain embodiments. Artificial reality system environment 100 shown in FIG. 1 may include near-eye display 120, an optional external imaging device 150, and an optional input/output interface 140, each of which may be coupled to an optional console 110. While FIG. 1 shows an example of artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display 120 may be a head-mounted display that presents content to a user. Examples of content presented by near-eye display 120 include one or more of images, videos, audio, or any combination thereof. In some embodiments, audio may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form-factor, including a pair of glasses. Some embodiments of near-eye display 120 are further described below with respect to FIGS. 2 and 3. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of eye-tracking unit 130, locators 126, position sensors 128, and IMU 132, or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (μLED) display, an active-matrix OLED display (AMOLED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereoscopic effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an antireflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics

124. In some embodiments, display optics 124 may project displayed images to one or more image planes that may be further away from the user's eyes than near-eye display 120.

Display optics 124 may also be designed to correct one or more types of optical errors, such as two-dimensional optical errors, three-dimensional optical errors, or any combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by external imaging device 150 to determine the artificial reality headset's position, orientation, or both. A locator 126 may be a light-emitting diode (LED), a corner cube reflector, a reflective marker, a type of light source that contrasts with an environment in which near-eye display 120 operates, or any combination thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 12 nm to about 380 nm), in another portion of the electromagnetic spectrum, or in any combination of portions of the electromagnetic spectrum.

External imaging device 150 may include one or more cameras, one or more video cameras, any other device capable of capturing images including one or more of locators 126, or any combination thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or any combination thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or any combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more eye-tracking systems. Eye tracking may refer to determining an eye's position, including orientation and location of the eye, relative to near-eye display 120. An eye-tracking system may include an imaging system to image one or more eyes and may optionally include a light emitter, which may generate light that is directed to an eye such that light reflected by the eye may be captured by the imaging system. For example, eye-tracking unit 130 may include a non-coherent or coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 120 milliwatts of power.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or any combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140. In some embodiments, external imaging device 150 may be used to track input/output interface 140, such as tracking the location or position of a controller (which may include, for example, an IR light source) or a hand of the user to determine the motion of the user. In some embodiments, near-eye display 120 may include one or more imaging devices to track input/output interface 140, such as tracking the location or position of a controller or a hand of the user to determine the motion of the user.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking subsystem 114, an artificial reality engine 116, and an eye-tracking subsystem 118. Some embodiments of console 110 may include different or additional devices or subsystems than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In various embodiments, the devices or subsystems of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking subsystem 114 may track movements of near-eye display 120 using slow calibration information from external imaging device 150. For example, headset tracking subsystem 114 may determine positions of a reference point of near-eye display 120 using observed locators from the slow calibration information and a model of near-eye display 120. Headset tracking subsystem 114 may also determine positions of a reference point of near-eye display 120 using position information from the fast calibration information. Additionally, in some embodiments, headset tracking subsystem 114 may use portions of the fast calibration information, the slow calibration information, or any combination thereof, to predict a future location of near-eye display 120. Headset tracking subsystem 114 may provide the estimated or predicted future position of near-eye display 120 to artificial reality engine 116.

Artificial reality engine 116 may execute applications within artificial reality system environment 100 and receive position information of near-eye display 120, acceleration information of near-eye display 120, velocity information of near-eye display 120, predicted future positions of near-eye display 120, or any combination thereof from headset tracking subsystem 114. Artificial reality engine 116 may also receive estimated eye position and orientation information from eye-tracking subsystem 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking subsystem 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking subsystem 118 to more accurately determine the eye's orientation.

Figure 2:
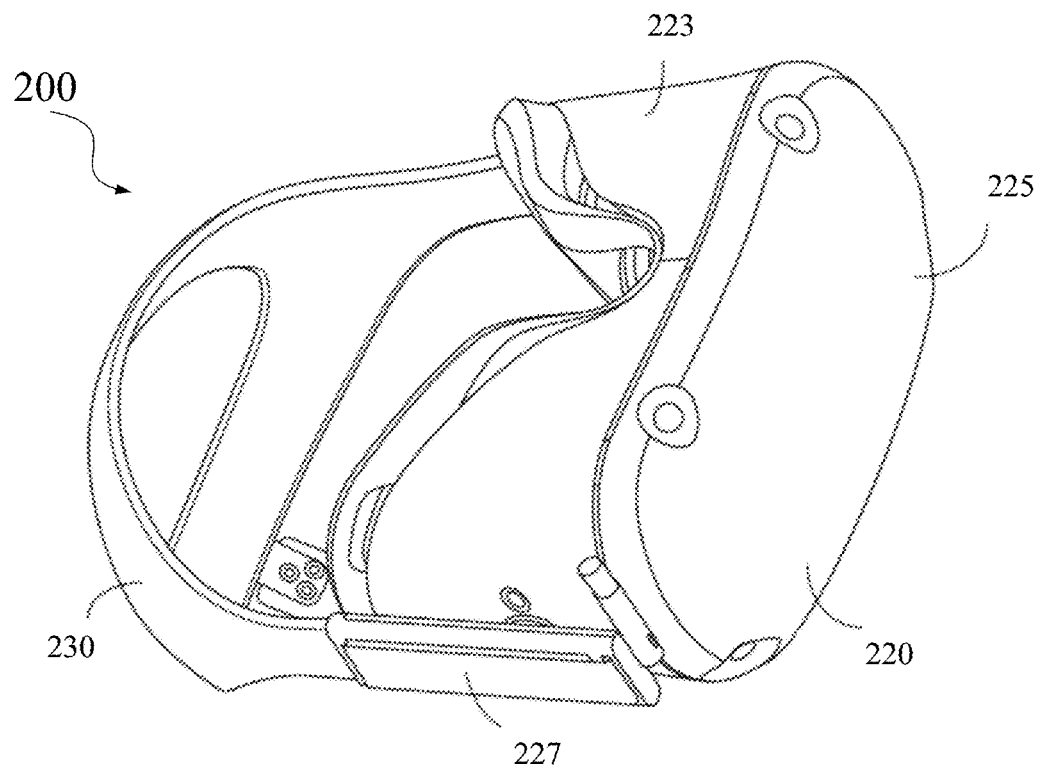
FIG. 2 is a perspective view of an example of a near-eye display in the form of a head-mounted display (HMD) device for implementing some of the examples disclosed herein.

FIG. 2 is a perspective view of an example of a near-eye display in the form of an HMD device 200 for implementing some of the examples disclosed herein. HMD device 200 may be a part of, e.g., a VR system, an AR system, an MR system, or any combination thereof. HMD device 200 may include a body 220 and a head strap 230. FIG. 2 shows a bottom side 223, a front side 225, and a left side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temple tips as shown in, for example, FIG. 3 below, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audio, or any combination thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, an LCD, an OLED display, an ILED display, a μLED display, an AMO- LED, a TOLED, some other display, or any combination thereof. HMD device 200 may include two eye box regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or any combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
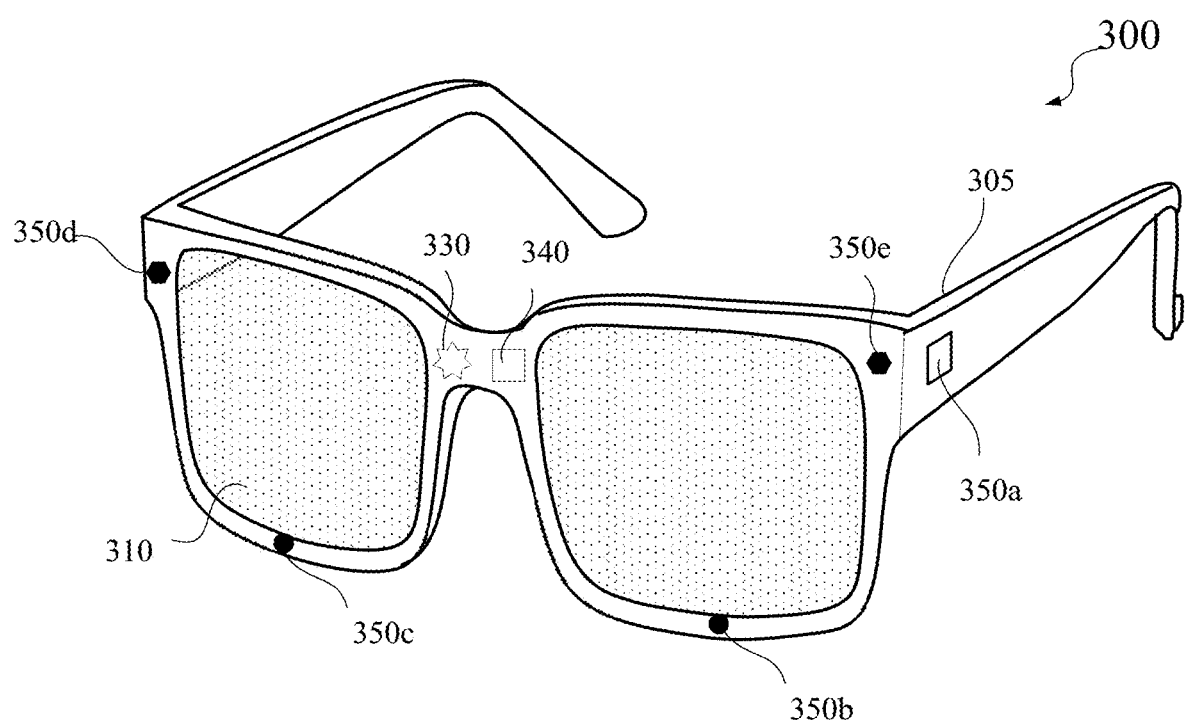
FIG. 3 is a perspective view of an example of a near-eye display in the form of a pair of glasses for implementing some of the examples disclosed herein.

FIG. 3 is a perspective view of an example of a near-eye display 300 in the form of a pair of glasses for implementing some of the examples disclosed herein. Near-eye display 300 may be a specific implementation of near-eye display 120 of FIG. 1, and may be configured to operate as a virtual reality display, an augmented reality display, and/or a mixed reality display. Near-eye display 300 may include a frame 305 and a display 310. Display 310 may be configured to present content to a user. In some embodiments, display 310 may include display electronics and/or display optics. For example, as described above with respect to near-eye display 120 of FIG. 1, display 310 may include an LCD display panel, an LED display panel, or an optical display panel (e.g., a waveguide display assembly).

Near-eye display 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different fields of views in different directions. In some embodiments, sensors 350a-350e may be used as input devices to control or influence the displayed content of near-eye display 300, and/or to provide an interactive VR/AR/MR experience to a user of near-eye display 300. In some embodiments, sensors 350a-350e may also be used for stereoscopic imaging.

In some embodiments, near-eye display 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light patterns onto the objects within the environment. In some embodiments, illuminator(s) 330 may be used as locators, such as locators 126 described above with respect to FIG. 1.

In some embodiments, near-eye display 300 may also include a high-resolution camera 340. High-resolution camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
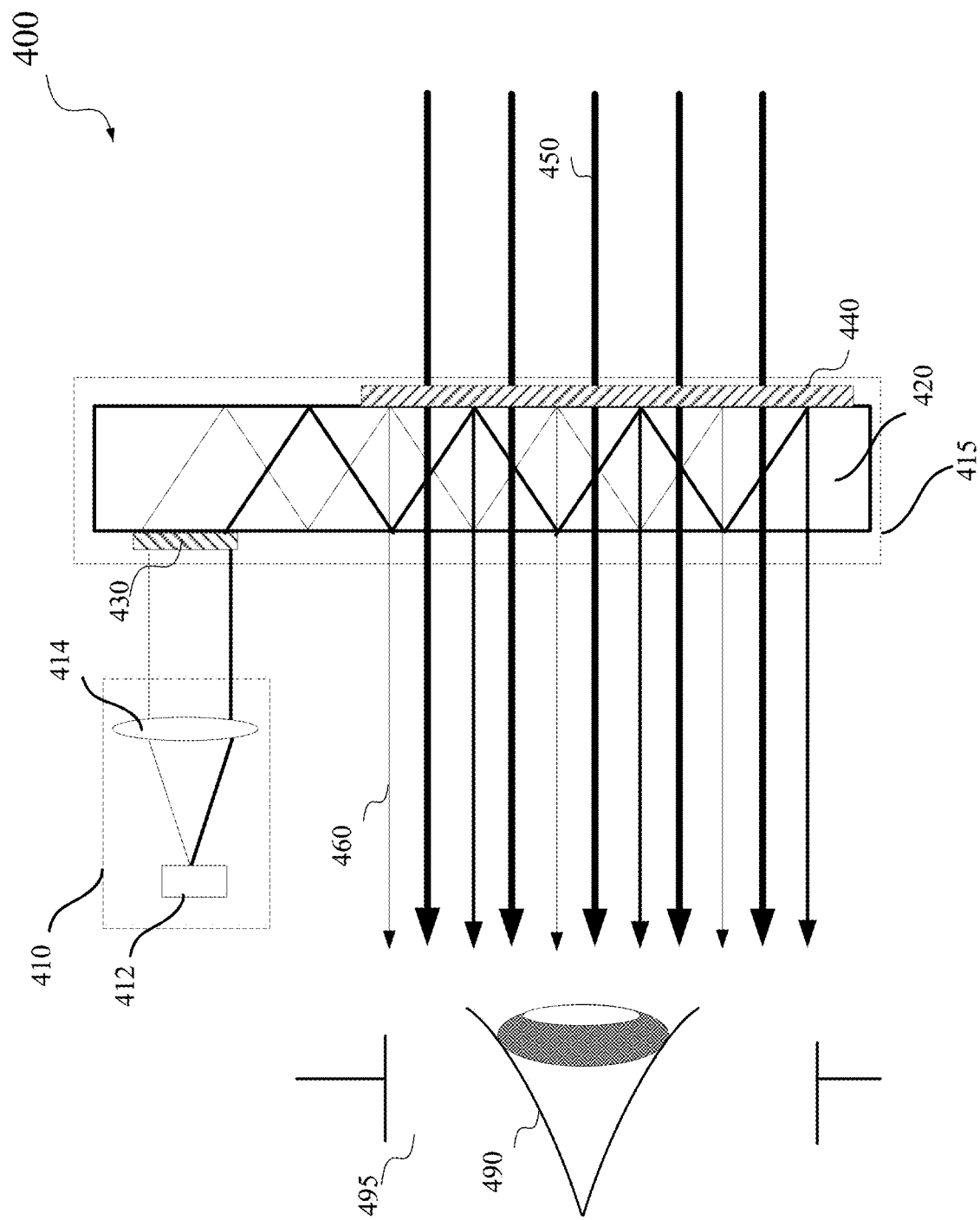
FIG. 4 illustrates an example of an optical see-through augmented reality system including a waveguide display according to certain embodiments.

FIG. 4 illustrates an example of an optical see-through augmented reality system 400 including a waveguide display according to certain embodiments. Augmented reality system 400 may include a projector 410 and a combiner 415. Projector 410 may include a light source or image source 412 and projector optics 414. In some embodiments, light source or image source 412 may include one or more micro-LED devices described above. In some embodiments, image source 412 may include a plurality of pixels that displays virtual objects, such as an LCD display panel or an LED display panel. In some embodiments, image source 412 may include a light source that generates coherent or partially coherent light. For example, image source 412 may include a laser diode, a vertical cavity surface emitting laser, an LED, and/or a micro-LED described above. In some embodiments, image source 412 may include a plurality of light sources (e.g., an array of micro-LEDs described above), each emitting a monochromatic image light corresponding to a primary color (e.g., red, green, or blue). In some embodiments, image source 412 may include three two-dimensional arrays of micro-LEDs, where each two-dimensional array of micro-LEDs may include micro-LEDs configured to emit light of a primary color (e.g., red, green, or blue). In some embodiments, image source 412 may include an optical pattern generator, such as a spatial light modulator. Projector optics 414 may include one or more optical components that can condition the light from image source 412, such as expanding, collimating, scanning, or projecting light from image source 412 to combiner 415. The one or more optical components may include, for example, one or more lenses, liquid lenses, mirrors, apertures, and/or gratings. For example, in some embodiments, image source 412 may include one or more one-dimensional arrays or elongated two-dimensional arrays of micro-LEDs, and projector optics 414 may include one or more one-dimensional scanners (e.g., micro-mirrors or prisms) configured to scan the one-dimensional arrays or elongated two-dimensional arrays of micro-LEDs to generate image frames. In some embodiments, projector optics 414 may include a liquid lens (e.g., a liquid crystal lens) with a plurality of electrodes that allows scanning of the light from image source 412.

Combiner 415 may include an input coupler 430 for coupling light from projector 410 into a substrate 420 of combiner 415. Combiner 415 may transmit light in a first wavelength range, such as visible light from about 400 nm to about 650 nm. Input coupler 430 may include a volume holographic grating, a diffractive optical element (DOE) (e.g., a surface-relief grating), a slanted surface of substrate 420, or a refractive coupler (e.g., a wedge or a prism). For example, input coupler 430 may include a reflective volume Bragg grating or a transmissive volume Bragg grating. Input coupler 430 may have a coupling efficiency of greater than 30%, 50%, 75%, 90%, or higher for visible light. Light coupled into substrate 420 may propagate within substrate 420 through, for example, total internal reflection (TIR). Substrate 420 may be in the form of a lens of a pair of eyeglasses. Substrate 420 may have a flat or a curved surface, and may include one or more types of dielectric materials, such as glass, quartz, plastic, polymer, poly(methyl methacrylate) (PMMA), crystal, or ceramic. A thickness of the substrate may range from, for example, less than about 1 mm to about 12 mm or more. Substrate 420 may be transparent to visible light.

Substrate 420 may include or may be coupled to a plurality of output couplers 440, each configured to extract at least a portion of the light guided by and propagating within substrate 420 from substrate 420, and direct extracted light 460 to an eyebox 495 where an eye 490 of the user of augmented reality system 400 may be located when augmented reality system 400 is in use. The plurality of output couplers 440 may replicate the exit pupil to increase the size of eyebox 495 such that the displayed image is visible in a larger area. As input coupler 430, output couplers 440 may include grating couplers (e.g., volume holographic gratings or surface-relief gratings), other diffraction optical elements, prisms, etc. For example, output couplers 440 may include reflective volume Bragg gratings or transmissive volume Bragg gratings. Output couplers 440 may have different coupling (e.g., diffraction) efficiencies at different locations. Substrate 420 may also allow light 450 from the environment in front of combiner 415 to pass through with little or no loss. Output couplers 440 may also allow light 450 to pass through with little loss. For example, in some implementations, output couplers 440 may have a very low diffraction efficiency for light 450 such that light 450 may be refracted or otherwise pass through output couplers 440 with little loss, and thus may have a higher intensity than extracted light 460. In some implementations, output couplers 440 may have a high diffraction efficiency for light 450 and may diffract light 450 in certain desired directions (i.e., diffraction angles) with little loss. As a result, the user may be able to view combined images of the environment in front of combiner 415 and images of virtual objects projected by projector 410.

In some embodiments, projector 410, input coupler 430, and output coupler 440 may be on any side of substrate 420. Input coupler 430 and output coupler 440 may be reflective gratings (also referred to as reflective gratings) or transmissive gratings (also referred to as transmissive gratings) to couple display light into or out of substrate 420.

Figure 5:
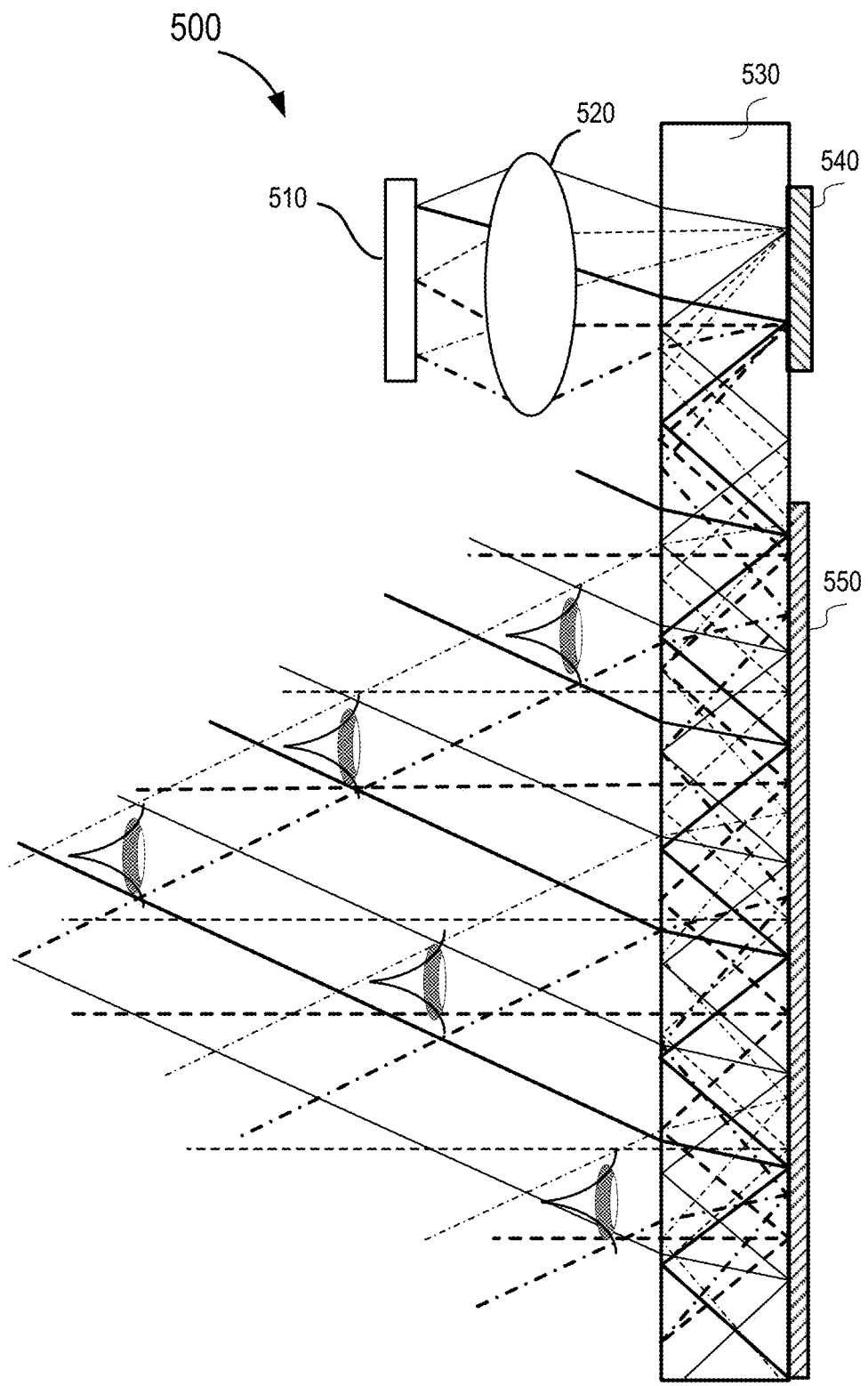
FIG. 5 illustrates an example of an optical see-through augmented reality system including a waveguide display for exit pupil expansion according to certain embodiments.

FIG. 5 illustrates an example of an optical see-through augmented reality system 500 including a waveguide display for exit pupil expansion according to certain embodiments. Augmented reality system 500 may be similar to augmented reality system 500, and may include the waveguide display and a projector that may include a light source or image source 510 and projector optics 520. The waveguide display may include a substrate 530, an input coupler 540, and a plurality of output couplers 550 as described above with respect to augmented reality system 500. While FIG. 5 only shows the propagation of light from a single field of view, FIG. 5 shows the propagation of light from multiple fields of view.

FIG. 5 shows that the exit pupil is replicated by output couplers 550 to form an aggregated exit pupil or eyebox, where different regions in a field of view (e.g., different pixels on image source 510) may be associated with different respective propagation directions towards the eyebox, and light from a same field of view (e.g., a same pixel on image source 510) may have a same propagation direction for the different individual exit pupils. Thus, a single image of image source 510 may be formed by the user's eye located anywhere in the eyebox, where light from different individual exit pupils and propagating in the same direction may be from a same pixel on image source 510 and may be focused onto a same location on the retina of the user's eye. In other words, the user's eye may convert angular information in the eyebox or exit pupil (e.g., corresponding to a Fourier plane) to spatial information in images form on the retina. FIG. 5 shows that the image of the image source is visible by the user's eye even if the user's eye moves to different locations in the eyebox.

FIG. 6A illustrates an example of a waveguide display system 600 including a waveguide (e.g., including one or more substrates) and diffraction gratings for exit pupil expansion. Waveguide display system 600 may include a substrate 610, which may be similar to substrate 530 and may be used as a waveguide to guide light through total internal reflection. Substrate 610 may be transparent to visible light and may include, for example, a glass, quartz, plastic, polymer, PMMA, ceramic, $Si_3N_4$, or crystal substrate. Substrate 610 may be a flat substrate or a curved substrate, and may include a single layer of a material or may including a layer stack. Substrate 610 may include a first broadside surface 612 and a second broadside surface 614.

In the illustrated example, waveguide display system 600 may also include an input coupler 620, a middle grating 630, and an output grating 640. Input coupler 620, middle grating 630, and output grating 640 may be formed on or in Substrate 610. Input coupler 620 may include a grating, a refractive coupler (e.g., a wedge or a prism), or a reflective coupler (e.g., a slanted reflective surface). For example, in one embodiment, input coupler 620 may include a prism that may couple display light of different colors and for different fields of view into substrate 610 by refraction. In another example, input coupler 620 may include a grating coupler that may diffract light of different colors into substrate 610 at different angles. Input coupler 620 may have a coupling efficiency of greater than 12%, 20%, 30%, 50%, 75%, 90%, or higher for visible light. In some embodiments, waveguide display system 600 may include projector optics (e.g., a lens, not shown in FIG. 6A), where display light from an image source may be collimated by the projector optics and projected onto input coupler 620, which may then couple the display light into substrate 610 by diffraction, refraction, or reflection. The light coupled into substrate 610 may be reflected by first broadside surface 612 and second broadside surface 614 through total internal reflection, such that the display light may propagate within substrate 610.

Middle grating 630 and output grating 640 may be positioned on one or two surfaces (e.g., first broadside surface 612 and second broadside surface 614) of substrate 610 for expanding incident display light beam in two dimensions to fill the eyebox with the display light. Middle grating 630 may be configured to expand the display light along one direction, such as approximately in the x direction. Output grating 640 may then expand the display light from middle grating 630 in a different direction (e.g., approximately in the y direction).

For example, as illustrated in FIG. 6A, display light coupled into substrate 610 and propagating within substrate 610 may reach a first portion 632 of middle grating 630 and may be diffracted by first portion 632 of middle grating 630 to change the propagation direction to a first direction (e.g., approximately the x direction) towards a second portion 634 of middle grating 630. As shown in FIG. 6A, while the display light propagates within substrate 610 along the first direction, a portion of the display light may be diffracted by a region of second portion 634 of middle grating 630 towards output grating 640, each time the display light propagating within substrate 610 reaches second portion 634 of middle grating 630. Output grating 640 may then expand the display light from middle grating 630 in a different direction (e.g., approximately in the y direction) by diffracting a portion of the display light to the eyebox each time the display light propagating within substrate 610 reaches output grating 640. As such, middle grating 630 and output grating 640 may replicate incident display light beam in two dimensions to fill an eyebox with the display light.

FIG. 6B illustrates an example of an eyebox including two-dimensional replicated exit pupils. FIG. 6B shows that a single input pupil 605 may be replicated by middle grating 630 and output grating 640 to form an aggregated exit pupil 660 that includes a two-dimensional array of individual exit pupils 662. For example, the exit pupil may be replicated in approximately the x direction by middle grating 630 and in approximately the y direction by output grating 640. As described above, output light from individual exit pupils 662 and propagating in a same direction may be focused onto a same spot in the retina of the user's eye. Thus, a single image may be formed by the user's eye using the output light in the two-dimensional array of individual exit pupils 662.

In some embodiments, first portion 632 and second portion 634 of middle grating 630 may be on a same holographic material layer and may have matching grating vectors (e.g., having a same grating vector in the x-y plane and a same grating vector and/or opposite grating vectors in the z direction). Due to the opposite Bragg conditions (e.g., +1 order and −1 order diffractions) for the diffractions at first portion 632 and second portion 634 of middle grating 630, first portion 632 and second portion 634 may compensate for the light dispersion caused by each other to reduce the overall light dispersion. In addition, an input grating of input coupler 620 and output grating 640 may have matching grating vectors (e.g., having the same grating vector in the x-y plane and having the same or opposite grating vectors in the z direction), where the input grating may couple the display light into substrate 610, while output grating 640 may couple the display light out of substrate 610. Due to the opposite diffraction directions and opposite Bragg conditions (e.g., +1 order and −1 order diffractions) for the diffractions at input coupler 620 and output grating 640, input coupler 620 and output grating 640 may compensate for the light dispersion caused by each other to reduce the overall dispersion. In this way, the light dispersion by first portion 632 and second portion 634 of middle grating 630 may be canceled out, and the dispersion by the input grating of input coupler 620 and output grating 640 may also be canceled out. Therefore, the overall dispersion of the display light by waveguide display system 600 can be minimized. As such, a higher resolution of the displayed image may be achieved.

Each of the input grating in input coupler 620, first portion 632 and second portion 634 of middle grating 630, and output grating 640 may include multiplexed VBGs configured to diffract display light of different colors and/or from different fields of view. Because each VBG of the multiplexed VBGs may have limited wavelength and/or angular bandwidth, different VBGs having different wavelength and/or angular bandwidths may be used to diffract different color components of the display light and/or display light from different fields of view. However, the achievable total refractive index modulations of a holographic material layer may be limited. Therefore, limited number of VBGs may be recorded in the holographic material layer, and the overall diffraction efficiency of VBG-based waveguide display system 600 may be low and/or the field of view of VBG-based waveguide display system 600 may be small.

Figure 7B:
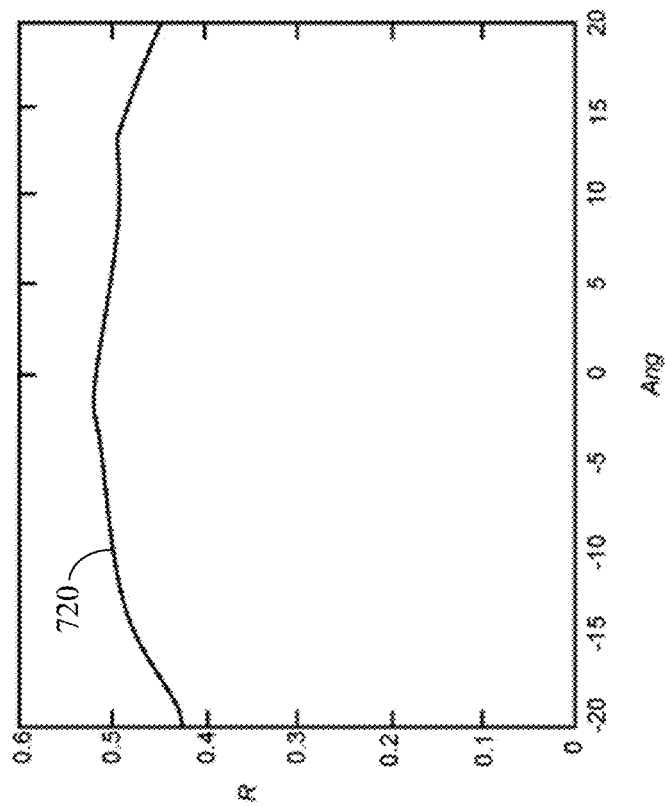
FIG. 7B includes a curve illustrating the angular bandwidth of an example of a transflective mirror.
Figure 7A:
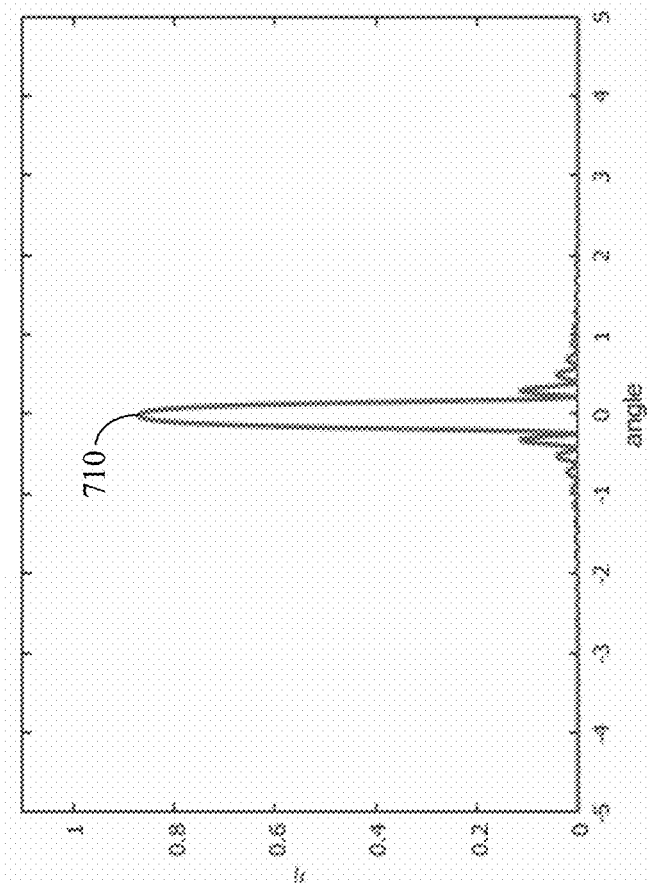
FIG. 7A includes a curve illustrating the angular bandwidth of an example of a volume Bragg grating (VBG).

FIG. 7A includes a curve 710 illustrating the angular bandwidth of an example of a VBG (e.g., a transmission VBG). The horizontal axis in FIG. 7A represents the deviation of the incident angle of the visible light from a central (nominal) incident angle (the Bragg angle) that the VBG is designed for. The vertical axis in FIG. 7A represents the corresponding diffraction efficiency. As shown by curve 710, the diffraction efficiency of the VBG may only be relatively high for light incident on the grating from a narrow angular range around the perfect Bragg condition (the Bragg angle). Even though not shown in FIG. 7A, the diffraction efficiency of the VBG may also only be relatively high for incident light within a narrow wavelength range around the perfect Bragg condition.

Therefore, optical see-through near-eye display systems that employ waveguides and diffraction gratings (e.g., volume Bragg gratings (VBGs)) to present display images from a projector to user's eyes may have limited field of view (FOV) and spectrum coverage, due to, for example, the limited angular and spectral bandwidth of the diffraction gratings. Some diffraction gratings such as VBGs may have limited diffraction efficiencies due to, for example, the limited achievable refractive index modulation of the holographic recording material. In addition, multiple gratings used for one-dimensional or two-dimensional pupil expansion as described above with respect to FIG. 6A may perform multiple times of optical filtering (e.g., Bragg filtering due to limited bandwidths of the VBGs) on the display images, which may lead to optical artifacts such as intercepting optical line patterns that may reduce the quality of the display images. Furthermore, diffraction gratings may have large dispersion between light of different colors and may have different diffraction angles for light of different colors. Therefore, different color components in a color image displayed by the near-eye display system may not overlap with each other. As a result, the quality of the displayed image (e.g., resolution, contrast, and/or color reproduction neutrality) may be reduced. Moreover, the fields of view for different colors may be reduced or partially clipped due to the light dispersion and the limited range of wave vectors of the light that can be guided by the waveguide display.

In some implementations, an optical see-through near-eye display system may include a waveguide with one or more arrays of partially reflective mirrors embedded in multiple locations of the waveguide to direct display images from the multiple locations to user's eyes, thereby replicating the exit pupil and expanding the eyebox in one or two dimensions. The partially reflective mirrors may also be referred to as transflective mirrors, geometric mirrors, or geometric reflectors. A waveguide including transflective mirrors in the waveguide may be referred to as a geometrical waveguide. A transflective mirrors may split incident light by partially reflecting incident light and partially transmitting the incident light such that a portion of the incident light may continue to propagate within the waveguide to be split by other transflective mirrors. Such near-eye display systems may be referred to as geometrical waveguide display systems.

In some implementations, a near-eye display system may include a waveguide display that may include both diffraction gratings (e.g., VBGs) and transflective mirrors for two-dimensional pupil expansion. For example, either the VBGs or the transflective mirrors may be used to deflect, at multiple locations along a first direction, the display light from an input coupler (e.g., a prism, grating, or slanted mirror) towards a second direction to expand the pupil in one dimension (e.g., the first direction). Such VBGs or transflective mirrors may be referred to herein as the middle grating (or a first output grating). Display light deflected at multiple locations by the middle grating towards the second direction may reach an output grating, which may include either VBGs or transflective mirrors and may deflect an incident display light beam at multiple locations along the second direction towards an eye box of the near-eye display system, thereby expanding the pupil in a second dimension (e.g., the second direction). Such waveguide display systems may be referred to herein as hybrid waveguide display systems. The combination of diffraction gratings and partial reflective mirrors may lead to a hybrid spectral and angular coverage that may be broader than that of VBG-based waveguide display systems. This may lead to an improvement of the FOV and a reduction of undesired optical artifacts such as ghost images and intercepting optical line patterns.

Each transflective mirror used in geometrical waveguide display systems or hybrid waveguide display systems may include, for example, a plurality of dielectric coating layers, one or more metal coating layers, or a combination of dielectric coating layers and metal coating layers. For example, a transflective mirror may include a plurality of dielectric coating layers coated on a substrate, where the plurality of dielectric coating layers may include two or more different transparent dielectric materials having different refractive indices. The number of dielectric coating layers, and the refractive index and the thickness of each dielectric coating layer may be selected to achieve the desired performance, such as the desired reflectivity (reflection efficiency) and polarization performance. A plurality of substrates with a plurality of transflective mirrors formed thereon may be stacked and bonded (e.g., glued) together using, for example, optically clear adhesives. The bonded stack may be cut at a certain angle to form one or more geometrical waveguides each including a plurality of transflective mirrors embedded therein. Different transflective mirrors in the plurality of transflective mirrors may have different reflectivity efficiencies. For example, the reflectivity of a first transflective mirror that may receive the in-coupled display light before a second transflective mirror may have a lower reflectivity than the second transflective mirror, such that the portion of the display light reflected by the first transflective mirror may have a similar intensity as the portion of the display light reflected by the second transflective mirror.

FIG. 7B includes a curve 720 illustrating the angular bandwidth of an example of a transflective mirror. The horizontal axis in FIG. 7B represents the deviation of the incident angle of the visible light from a central (nominal) incident angle of the transflective mirror, and the vertical axis represents the corresponding reflectivity. In the example shown by curve 720, the reflectivity of the transflective mirror can be close to 50% (half-reflective half-transmissive) for light incident on the grating from a wide angular range around the central (nominal) incident angle. For example, the full-width half-magnitude (FWHM) reflection angular range of a transflective mirror may be greater than 40° or higher. Even though not shown in FIG. 7B, the reflectivity of the transflective mirror may also be high for incident light within a wide wavelength range.

As indicated by FIG. 7B, geometrical waveguide display systems or hybrid waveguide display systems using transflective mirrors may achieve large FOV, and may also have minimum or no color dispersion, and good image resolution and quality. However, geometrical waveguide display systems may be difficult and/or costly to make and may be difficult to achieve uniform light intensity within the eyebox. Imprecision in the processes of making individual transflective mirrors, stacking and bonding substrates with transflective mirrors coated thereon, and cutting the stack of substrates with transflective mirrors at a certain angle to form geometrical waveguides may lead to imperfections in the displayed images, such as black lines, nonuniformity in brightness, ghost images, and the like. For example, some geometrical waveguide display systems may have ghost stray rays and double imaging issues that may reduce the display quality. Some geometrical waveguide display systems may only achieve one-dimensional pupil expansion.

A geometrical waveguide may generally include a prism (as the input coupler) and two groups of geometrical reflectors to guide and expand display light to an eyebox. The prism may induce color dispersion that may often be difficult to fully compensate by partial reflective mirrors and the substrate along the light path. According to certain embodiments disclosed herein, a geometrical waveguide display may include 3 or 4 groups of geometrical reflectors to achieve full and complete color dispersion compensation, where the display light may interact with both input mirrors and output mirrors that have the same mirror orientations, and may interact with both a first group of middle mirrors and a second group of middle mirrors (or different regions of a same group of middle mirrors) that may have the same mirror orientations. The combination of multiple groups of mirrors can produce close to zero dispersion from waveguide input to waveguide output and the eyebox for visible light (e.g., red, green, and blue light) from all angles. The input mirror(s) may include a single mirror with reflectivity close to 100%, or a group of mirrors including one mirror with reflectivity close to 100% and one or more transflective mirrors with reflectivity less than 100%.

Figure 8B:
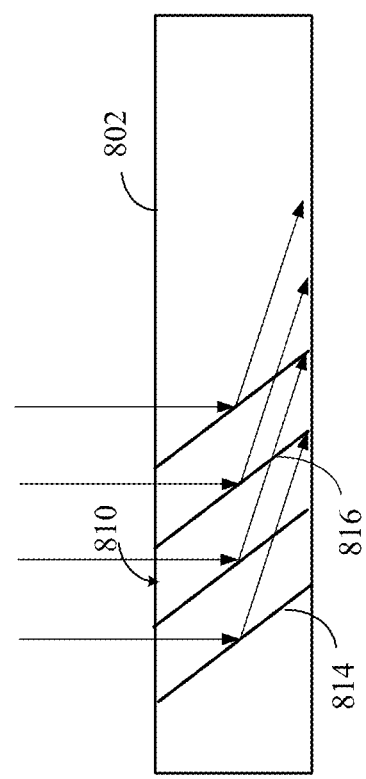
FIG. 8B shows an example of an input coupler that includes a mirror according to certain embodiments.
Figure 8C:
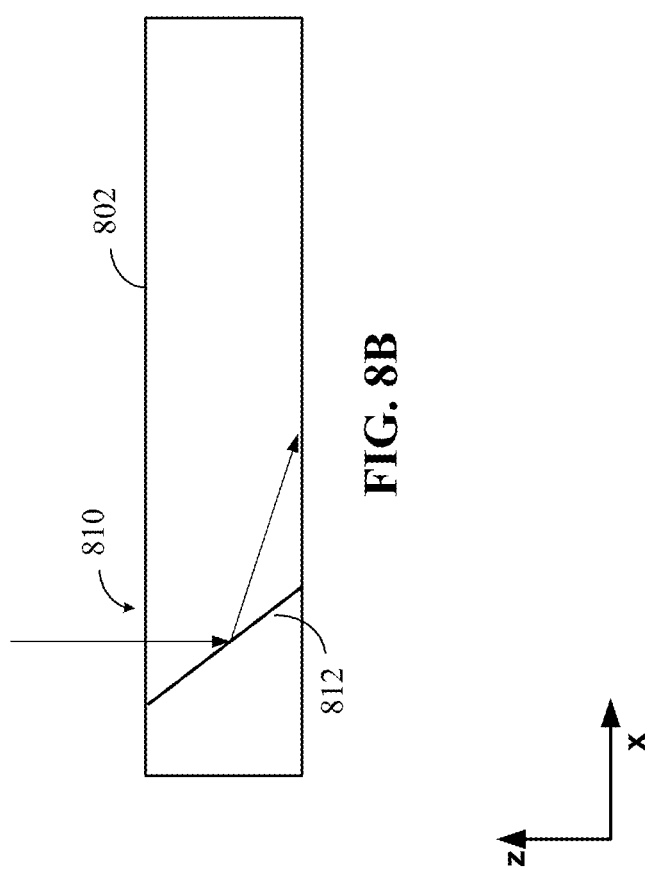
FIG. 8C shows another example of an input coupler that includes a mirror and a plurality of transflective mirrors according to certain embodiments.
Figure 8A:
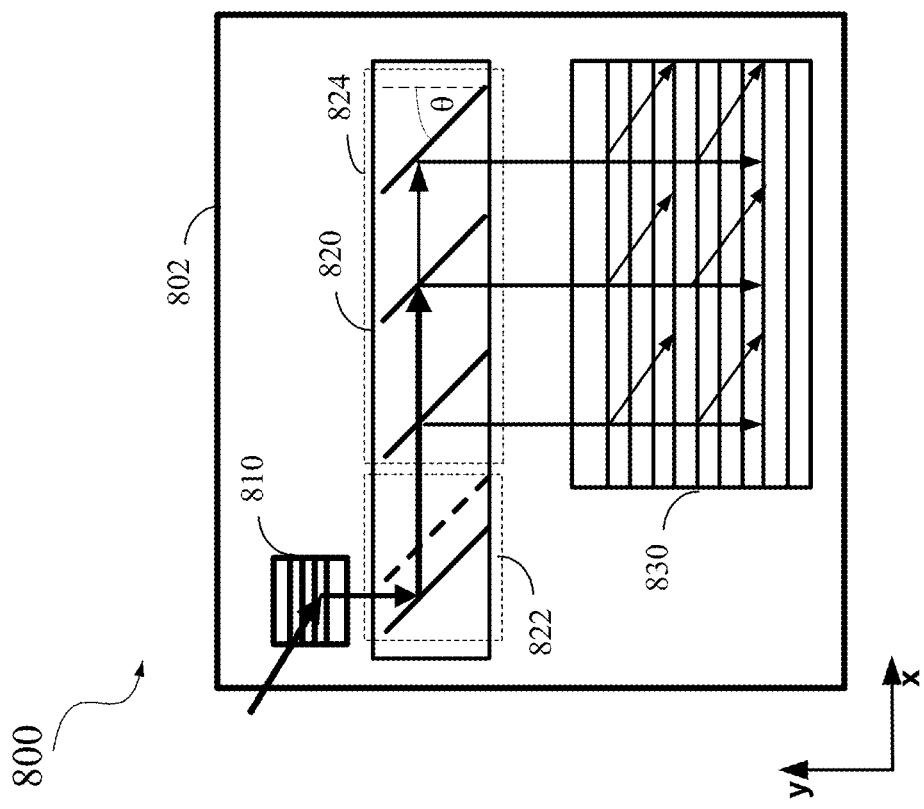
FIG. 8A illustrates an example of a waveguide display including three or four groups of reflective and/or transflective mirrors for two-dimensional pupil expansion and dispersion compensation according to certain embodiments.

FIG. 8A illustrates an example of a waveguide display 800 including three or four groups of reflective and/or transflective mirrors for two-dimensional pupil expansion and dispersion compensation according to certain embodiments. Waveguide display 800 may be similar to waveguide display 600, but may use reflective or transflective mirrors (rather than refractive or diffractive optical components) to replace input coupler 620, middle grating 630, and output grating 640. In the example illustrated in FIG. 8A, waveguide display 800 may include an input coupler 810 that may include one or more reflective and/or transflective mirrors and may be referred to as the input mirror. The input mirror may be used to couple display light into a waveguide 802 such that the display light may propagate within waveguide 802 through total internal reflection.

Waveguide display 800 may include a middle mirror 820 that may include a group of reflective and/or transflective mirrors having the same orientation. One or more reflective and/or transflective mirrors of middle mirror 820 may be used to direct display light from input coupler 810 towards other reflective and/or transflective mirrors of middle mirror 820, which may replicate the pupil in a first dimension (e.g., approximately the x direction) by reflecting portions of the display light at multiple locations along the first dimension as shown in FIG. 8A. For example, a first mirror and a last mirror (e.g., in x direction) in middle mirror 820 may be reflective mirrors with reflectivity close to 100%, and mirrors between the first mirror and the last mirror in middle mirror 820 may be transflective mirrors that have reflectivity less than 100% and are partially transmissive.

In some embodiments, middle mirror 820 may include a first middle mirror 822 and a second middle mirror 824. First middle mirror 822 may include one or more reflective and/or transflective mirrors that may direct display light from input coupler 810 towards second middle mirror 824. For example, the first mirror (e.g., in x direction) in first middle mirror 822 may be a reflective mirror with reflectivity close to 100% and other mirrors in first middle mirror 822 may be transflective mirrors that are partially transmissive. Second middle mirror 824 may include a plurality of reflective and/or transflective mirrors and may expand the pupil in a first dimension (e.g., approximately the x direction) by reflecting portions of the display light at multiple locations along the first dimension as shown in FIG. 8A. In one example, the last mirror (e.g., in x direction) in second middle mirror 824 may be a reflective mirror with reflectivity close to 100%, and other mirrors in second middle mirror 824 may be transflective mirrors that are partially transmissive.

Waveguide display 800 may also include an output mirror 830, which may include a plurality of reflective and/or transflective mirrors. As described above with respect to FIGS. 6A and 6B and shown in FIG. 8A, the transflective mirrors in output mirror 830 may reflect, at multiple locations along a second dimension (e.g., approximately the y direction), portions of the display light from each location of the multiple locations of middle mirror 820 to the eyebox to replicate the exit pupil in the second dimension. Therefore, middle mirror 820 and output mirror 830 may replicate the pupil in two-dimensions to fill the eyebox. In one example, the last mirror (e.g., in −y direction) in output mirror 830 may be a reflective mirror with reflectivity close to 100%, and other mirrors in output mirror 830 may be transflective mirrors that are partially transmissive.

As shown in FIG. 8A, input coupler 810 and output mirror 830 may have the same or similar orientations and may reflect light in opposite manners (e.g., into or out of waveguide 802), and thus may compensate the dispersion caused by each other to achieve dispersion-free pupil expansion. Similarly, a first portion of middle mirror 820 (or first middle mirror 822) and a second portion of middle mirror 820 (or second middle mirror 824) may have the same or similar orientations and may reflect light in opposite manners (e.g., from −y direction to x direction or form x direction to −y direction), and thus may compensate the dispersion caused by each other to achieve dispersion-free pupil expansion.

FIG. 8B shows an example of input coupler 810 that includes a mirror 812 according to certain embodiments. Mirror 812 may be oriented such that display light reflected by mirror 812 may propagate within waveguide 802 through total internal reflection. Mirror 812 may have a very high reflectivity, such as close to 100%, and may have a sufficiently large input aperture to receive the display light and achieve a high resolution for the waveguide display.

FIG. 8C shows another example of input coupler 810 that includes a mirror 814 and a plurality of transflective mirrors 816 according to certain embodiments. Mirror 814 and transflective mirrors 816 may be oriented such that display light reflected by the mirrors may propagate within waveguide 802 through total internal reflection. Mirror 814 may be similar to mirror 812 and may have a very high reflectivity, such as close to 100%. Transflective mirrors 816 may have reflectivity less than 100% and may be at least partially transmissive. Input coupler 810 that includes mirror 814 and transflective mirrors 816 may have a sufficiently large input aperture to receive the display light and achieve a high resolution for the waveguide display.

In some geometrical waveguide (or hybrid waveguide) display systems, the transflective mirrors may be seen by the user or a person in front of the display system as "stripes" on the eyepiece, which may affect the appearance of the display system (e.g., a near-eye display system). For example, in either geometrical waveguide display systems or hybrid waveguide display systems, when the transflective mirrors are used as the middle grating for pupil expansion in a first dimension, the transflective mirrors may generally be positioned at an angle close to 90° with respect to a broadside surface of the waveguide (e.g., approximately perpendicular to the broadside surface). Such orientations of the transflective mirrors may make the transflective mirrors conspicuous to a person in front of the user because, when the person views the near-eye display system from an oblique angle, there may be a large transmissivity (or transparency) contrast between the partially reflective regions (the transflective mirrors) and regions between the partially reflective regions, which may lead to the person's eye perceiving conspicuous structures (e.g., stripes).

Figure 9C:
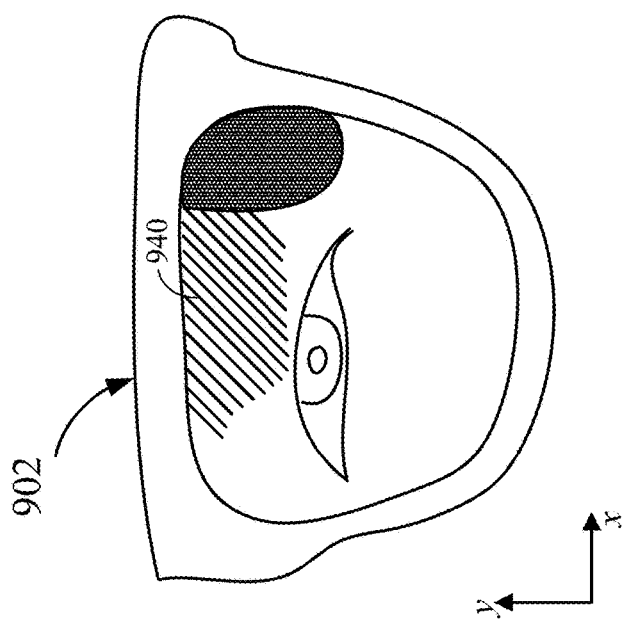
FIG. 9C illustrates an example of a near-eye display system with transflective mirrors in a waveguide.
Figure 9A:
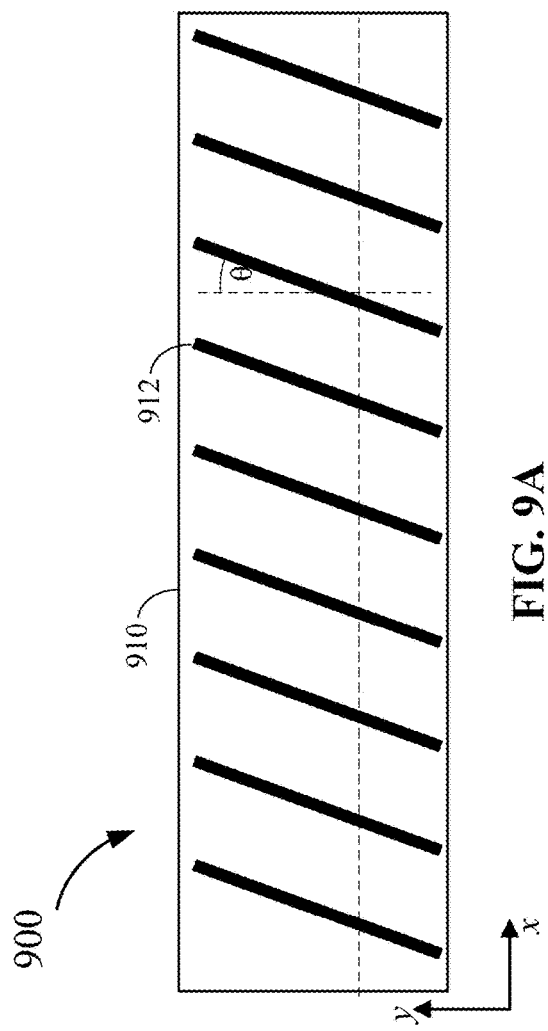
FIGS. 9A and 9B illustrate an example of waveguide display including an array of transflective mirrors in a waveguide.
Figure 9B:
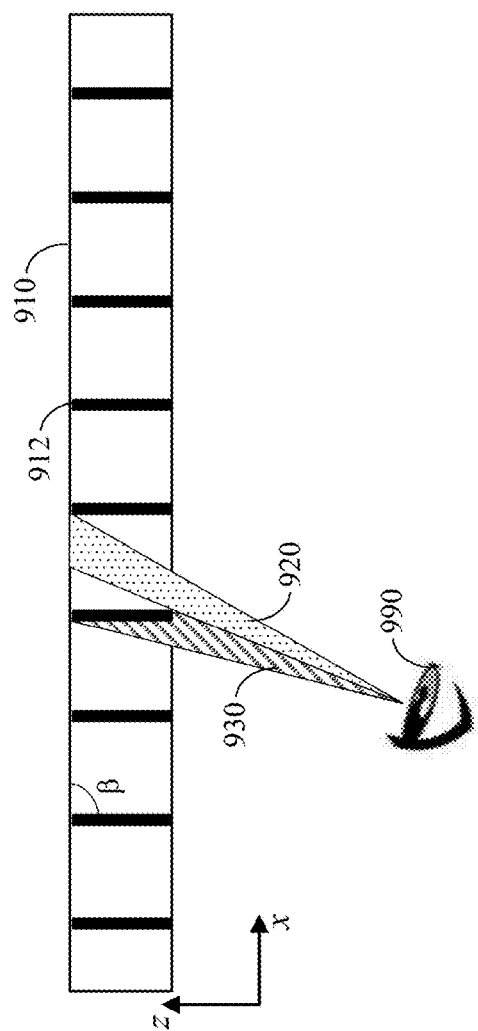

FIGS. 9A and 9B illustrate an example of waveguide display 900 including an array of transflective mirrors 912 in a waveguide 910. The array of transflective mirrors 912 may form a grating structure (e.g., to replace middle grating 630). Transflective mirrors 912 in the array of transflective mirrors may be planar and may be parallel to each other. As illustrated in FIG. 9A, when viewed from the broadside surface (e.g., an x-y plane) of waveguide 910, the angle between transflective mirrors 912 and the vertical direction (e.g., y direction) may be θ in the x-y plane. As illustrated in FIG. 9B, in a cross-sectional view (e.g., an x-z plane), the angle between transflective mirrors 912 and the broadside surface may be β (e.g., in the x-z plane). Thus, the grating vector (or the surface normal direction of each planar transflective mirror) may be {cos θ·sin β, sin θ·sin β, cos β} in the (x, y, z) space. In the illustrated example, ß may be close to 90°, and thus the grating vector may be about {cos θ, sin θ, 0}.

FIG. 9B also shows that, when an eye 990 of a person in front of waveguide display 900 looks at waveguide display 900 from an oblique angle, waveguide display 900 may have minimum reflectivity or high transparency in a field of view represented by an angular range 920, but may have high reflectivity (e.g., about 50% or higher) or low transparency in a field of view represented by an angular range 930. As such, the person may see interleaved brighter regions and darker regions, rather than a uniform bright or dark region. In addition, such orientations of the transflective mirrors may also decrease the optical resolution of the waveguide display systems because the sizes of the light beams reflected by the transflective mirrors (e.g., measured in the x direction) may be small and thus the minimum spot size of the images on the image plane may be large.

FIG. 9C includes an image of a near-eye display system 902 with transflective mirrors 940 in a waveguide (e.g., a lens substrate). Near-eye display system 902 may be in the form of a pair of eye glasses. Transflective mirrors 940 may replace middle grating 630. As shown in FIG. 9C, transflective mirrors 940 may appear as interleaved bright and dark regions (stripes), and may be fairly conspicuous. For waveguide display systems, it is generally desirable that the optical gratings or other optical structures within or on the waveguides be as inconspicuous as possible.

According to certain embodiments, transflective mirrors used in the middle grating of a near-eye display system, such as a geometrical waveguide display system or a hybrid waveguide display system, may be tilted at a certain angle (e.g., within about 40-60°) with respect to a broadside surface of the waveguide. In this way, a person viewing the near-eye display system from different angles may mostly view the partially reflective regions (rather than high-transmittance gaps between the transflective mirrors), and thus may perceive a low transmissivity (or transparency) contrast. As such, the transflective mirrors may not be conspicuous to the person. In addition, when the transflective mirrors of the middle grating are tilted from the surface-normal direction of the broadside surface of the waveguide, the sizes of the light beams reflected by the transflective mirrors may be large, and thus the effective optical aperture of the display system may be larger and the optical resolution of the display system may be higher.

In one example, a waveguide display system may include an input coupler (e.g., a prism, a grating, or a slanted mirror), a middle light deflection structure (e.g., a middle grating or a first pupil expander including VBGs or an array of transflective mirrors), and an output light deflection structure (e.g., an output grating or a second pupil expander including VBGs or an array of transflective mirrors). The input coupler may couple display light from a projector into the waveguide. In some embodiments, the middle grating may include an array of transflective mirrors arranged along a first direction and tilted at an angle less that about 60° (e.g., about 45° or 50°) with respect to the broadside surface of the waveguide. Each transflective mirror of the array of transflective mirrors may deflect a portion of the incident display light to a second direction towards the output grating. The output grating may include an array of transflective mirrors or VBGs, and may, at each location of multiple locations along the second direction, direct a portion of an incident display light beam from the middle grating towards an eye box of the waveguide display system. In some embodiments, transflective mirrors may be used in the middle grating and may be tilted at an angle between about 40° and about 60° (e.g., about 45° or) 50° with respect to the broadside surface of the waveguide. In some embodiments, transflective mirrors may be used in the output grating and may be tilted at an angle between about 25° and about 35° with respect to the broadside surface of the waveguide.

Figure 10B:
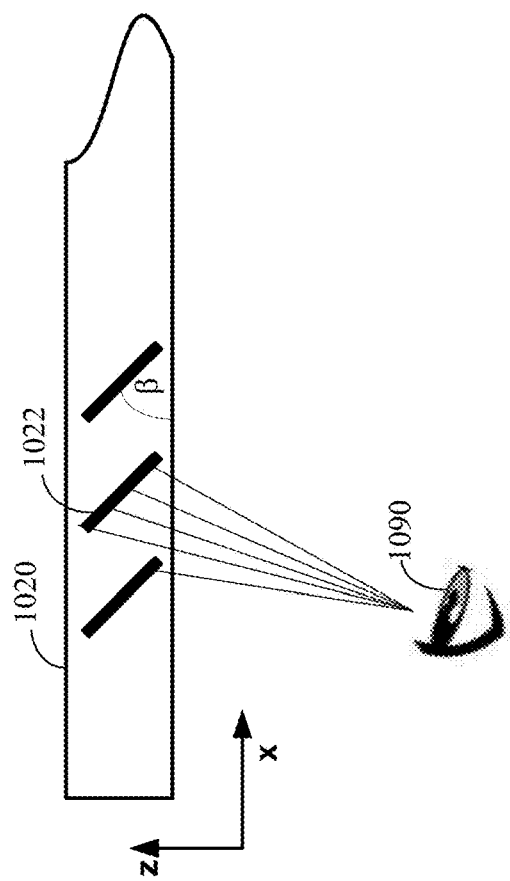
FIGS. 10A and 10B illustrate an example of a waveguide display including geometric mirrors for pupil expansion according to certain embodiments.
Figure 10A:
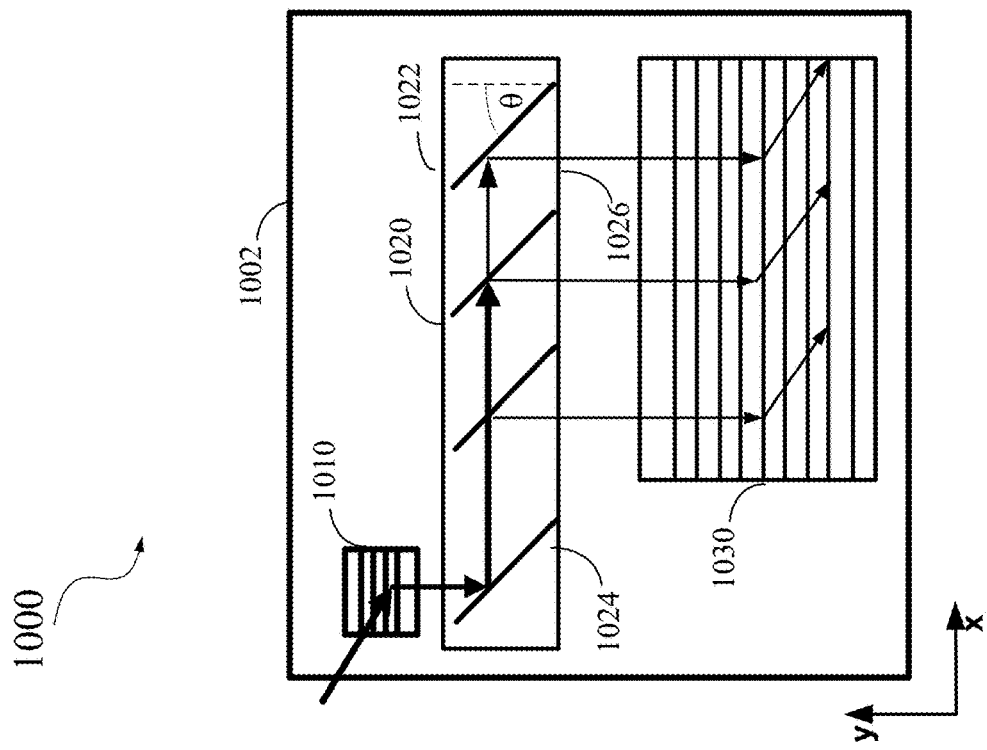

FIGS. 10A and 10B illustrate an example of a waveguide display 1000 including geometric mirrors for pupil expansion according to certain embodiments. In the illustrated example, waveguide display 1000 may include a waveguide 1002 (e.g., a substrate), and an input coupler 1010, a first pupil expander 1020, and a second pupil expander 1030 formed on or in waveguide 1002. waveguide display 1000 may be similar to waveguide display system 600, but may include at least one pupil expander (e.g., first pupil expander 1020 or second pupil expander 1030) that includes transflective mirrors. For example, first pupil expander 1020 may include an array of transflective mirrors 1022 that forms a grating structure.

Display light from a projector may be collimated and projected onto input coupler 1010 by projector optics. Input coupler 1010 may include, for example, a transmission or reflection grating, a prism, or a mirror or another reflective surface, and may couple the display light into waveguide 1002 by diffraction, refraction, or reflection. Display light coupled into waveguide 1002 may be reflected by opposite broadside surfaces of waveguide 1002 through total internal reflection, such that the display light may propagate within waveguide 1002 towards first pupil expander 1020. Display light from input coupler 1010 may reach a first portion 1024 of first pupil expander 1020 and may be reflected by a transflective mirror 1022 (which may have a very high reflectivity) in the first portion 1024 to change the propagation direction to a first direction (e.g., approximately the x direction) towards a second portion 1026 of first pupil expander 1020. While the display light propagates within waveguide 1002 along the first direction through total internal reflection, a portion of the display light may be reflected by a transflective mirror 1022 of first pupil expander 1020 towards second pupil expander 1030 as shown in FIG. 10A, each time the display light propagating within waveguide 1002 reaches a transflective mirror 1022. A portion of the display light may pass through the transflective mirror and continue to propagate within waveguide 1002 until it reaches another transflective mirror 1022, which may reflect at least a portion of the incident display light towards second pupil expander 1030. As such, first pupil expander 1020 may replicate the input pupil along the first direction (e.g., approximately the x direction). Second pupil expander 1030 may include a diffraction grating or transflective mirrors, and may replicate the input pupil along a second direction (e.g., approximately the y direction) in a similar manner through multiple partial reflections or diffractions of the incident display light towards the eyebox. As such, first pupil expander 1020 and second pupil expander 1030 may replicate input pupil in two dimensions to fill the eyebox as described above with respect to FIGS. 6A, 6B, and 8A.

In the illustrated example, each transflective mirror 1022 in first pupil expander 1020 may be at an angle θ (e.g., about 45°) with respect to the vertical direction (e.g., y direction) in an x-y plane as shown in FIG. 10A, when viewed from the broadside surface of waveguide 1002. As illustrated in FIG. 10B, in a cross-sectional view (e.g., an x-z plane), the angle between transflective mirrors 1022 and the broadside surface of waveguide 1002 may be β (e.g., in the x-z plane). Thus, the grating vector (or the surface normal direction of each planar transflective mirror 1022) may be {cos θ·sin β, sin θ·sin β, cos β}. In the example shown in FIGS. 10A and 10B, β may be close to about 50°, and thus the grating vector may be {cos θ·sin 50°, sin θ·sin 50°, cos 50°}.

As shown in FIG. 10B, when the angle between transflective mirrors 1022 and the broadside surface of waveguide 1002 is less than about 60° (e.g., between about 40°-60°), first pupil expander 1020 may have the same or similar reflectivity (or transparency) in the field of view of an eye 1090 of a person in front of waveguide display 1000 and looking at waveguide display 1000 from an oblique angle, because there may be no gaps between transflective mirrors 1022 in the field of view of eye 1090. As such, eye 1090 may not see interleaving bright regions and dark regions, and thus first pupil expander 1020 may have a more uniform transmissivity (or transparency) and may not appear conspicuous to a person in front of waveguide display 1000.

FIGS. 11A-11C show the relationship between the optical resolution and the size of the optical aperture (or input beam width) of an imaging system. FIG. 11A shows a simplified imaging system 1100 (e.g., a lens or an eye) with an optical aperture 1110 and an image plane 1120, where an optical component, such as a lens, may be positioned at optical aperture 1110. In the illustrated example, optical aperture 1110 may have a circular shape with a diameter D, and thus may allow a light beam (e.g., a collimated light beam) with a diameter D to pass through. FIG. 11B shows a best-focused light spot 1122 of the light beam focused by imaging system 1100 (e.g., a lens of imaging system 1100). The minimum size of the center bright region of light spot 1122 may be limited by the diffraction limit due to the limited size of optical aperture 1110. FIG. 11C shows the intensity of light spot 1122 as a function of the view angle from optical aperture 1110. As illustrated, at image plane 1120, the best-focused light spot 1122 may have the first minimum at an angle θ (viewed from optical aperture 1110) that is approximately given by:

$$\sin\theta \approx 1.22\frac{\lambda}{D},$$

where λ is the wavelength of the light beam. Therefore, a larger optical aperture or a larger input light beam may result in a better resolution (smaller spots). Increasing the size of the optical aperture or the light beam may improve the modulation transfer function (MTF), and thus may improve the contrast of the images in addition to the resolution of the images.

As described above with respect to, for example, FIG. 9B, when the angle between the transflective mirrors and the broadside surface of the waveguide is large (e.g., close to 90°), the sizes of the light beams reflected by the transflective mirrors may be small. Therefore, the minimum spot size of the images on the image plane may be large, and thus the optical resolution of the waveguide display system may be low.

FIG. 12A illustrates an example of a pupil expander 1200 in the form of a geometrical waveguide that includes a set of transflective mirrors 1212 within a waveguide 1210. In the illustrated example, the angle between transflective mirrors 1212 and broadside surfaces 1214 of waveguide 1210 may be large (e.g., ≥60°, such as close to 90°), and thus the diameter D1 of the reflected beam (measured in the x direction) may be small. As such, the MTF of pupil expander 1200 may be low, and the resolution and/or contrast of the images displayed to the user's eye may not be good.

FIG. 12B illustrates another example of a pupil expander 1202 in the form of a geometrical waveguide that includes a set of transflective mirrors 1222 within a waveguide 1220 according to certain embodiments. In the illustrated example, the angle between transflective mirrors 1222 and broadside surfaces 1224 of waveguide 1220 may be smaller (e.g., ≤60°, such as between about 40° and about 60°), and thus the diameter D2 of the reflected beam (measured in the x direction) may be larger, such as larger than a half of the thickness of waveguide 1220 or larger than the thickness of waveguide 1220. As such, the MTF of pupil expander 1200 may be higher, and the resolution and/or the contrast of the images displayed to the user's eye may be better.

When the angle between transflective mirrors 1222 and broadside surfaces 1224 of waveguide 1220 used as the middle grating is too small (e.g., ≤40° or smaller), transflective mirrors 1222 may not be able to split incident light guided by the waveguide in a desired manner so as to direct the incident light to the desired direction and cover the desired FOV and desired eyebox area with a given form factor.

As described above, in various embodiments, transflective mirrors may be used as the middle grating (or the first output grating) or the output grating (or the second output grating). When used as the middle grating, the transflective mirrors may be tilted at an angle between about 40° and about 60° (e.g., about 45° or 50°) with respect to the broadside surface of the waveguide. When used as the output grating, the transflective mirrors may be tilted at an angle between about 25° and about 35° with respect to the broadside surface of the waveguide. In some waveguide display systems, pupil expanders including transflective mirrors may be arranged differently from the arrangements shown in FIGS. 6A and 9A.

Figure 13:
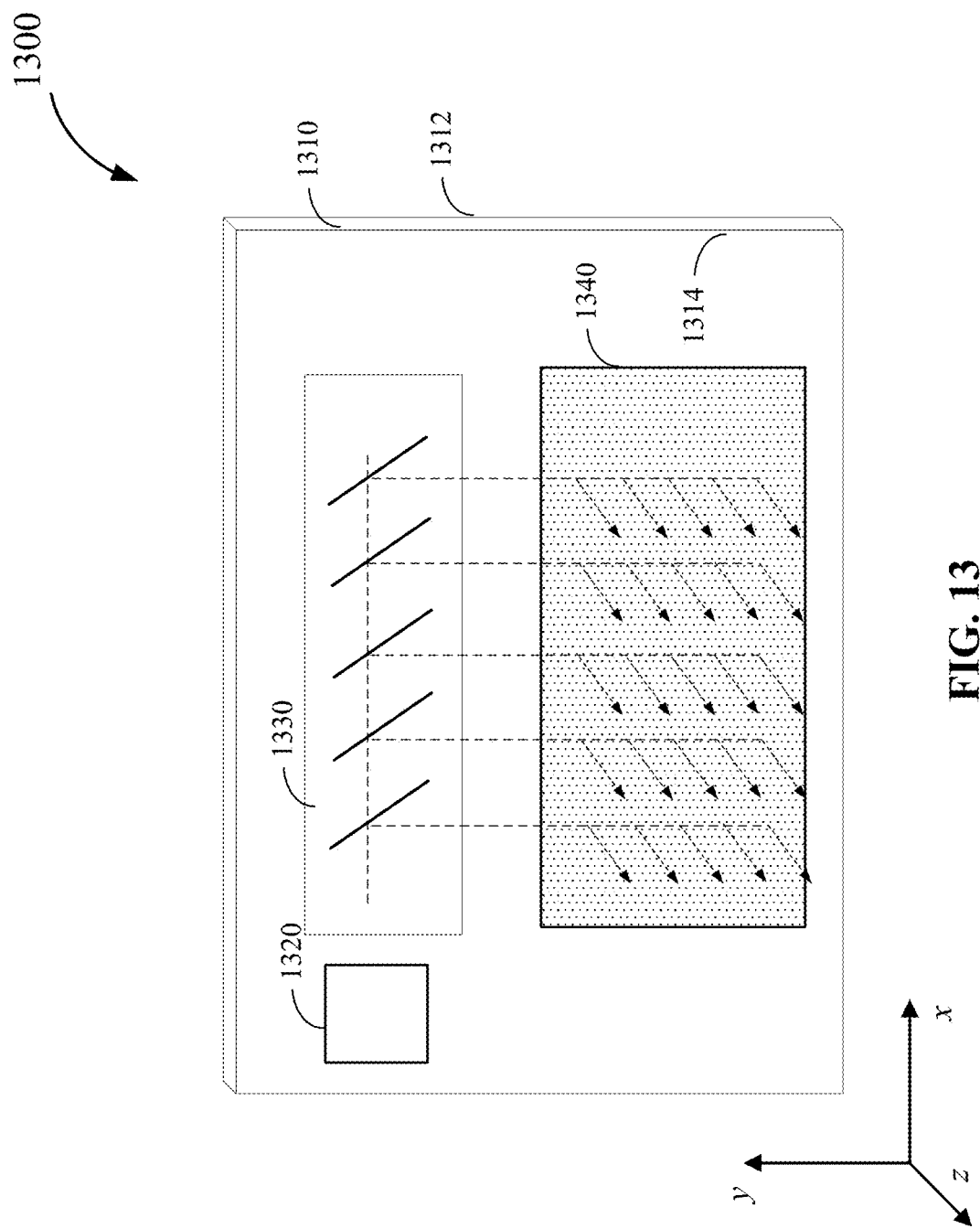
FIG. 13 illustrates an example of a waveguide display system according to certain embodiments.

FIG. 13 illustrates an example of a waveguide display system 1300 that may be a geometrical waveguide display system or a hybrid waveguide display system according to certain embodiments. Waveguide display system 1300 may include a substrate 1310, which may be similar to substrate 610 or waveguide 802 or 1002 described above. Substrate 1310 may be transparent to visible light and may include, for example, a glass, quartz, plastic, polymer, PMMA, ceramic, or crystal substrate. Substrate 1310 may be a flat substrate or a curved substrate. Substrate 1310 may include a first surface 1312 and a second surface 1314. Display light may be coupled into substrate 1310 by an input coupler 1320, and may be reflected by first surface 1312 and second surface 1314 through total internal reflection, such that the display light may propagate within substrate 1310.

As described above, input coupler 1320 may include a diffractive coupler (e.g., a volume holographic grating or a surface-relief grating), a refractive coupler (e.g., a wedge or a prism), or a reflective coupler (e.g., a reflective surface having a slant angle with respect to substrate 1310). For example, in one embodiment, input coupler 1320 may include a prism that may couple display light of different colors into substrate 1310 at a same refraction angle. The prism may have a refractive index that matches the refractive index of substrate 1310 and may include a wedge having a certain angle such that light coupled into substrate 1310 may be incident on surface 1312 or 1314 of substrate 1310 at incident angles greater than the critical angle for substrate 1310. As such, display light coupled into substrate 1310 may be guided by substrate 1310 through total internal reflection. In another example, the input coupler may include a grating coupler that may diffract light of different colors into substrate 1310 at different directions.

Waveguide display system 1300 may also include a first grating 1330 and a second grating 1340 within substrate 1310 and/or on one or two broadside surfaces (e.g., first surface 1312 and second surface 1314) of substrate 1310 for expanding incident display light beam in two dimensions to fill an eyebox with the display light. In one example, first grating 1330 may include one or more transflective mirrors arranged substantially along the x direction. Each transflective mirror may be configured to partially reflect and partially transmit display light as display light propagates in substrate 1310, for example, substantially along the x direction. As such, first grating 1330 may split the display light beam and replicate the input pupil in approximately the x direction. In another example, first grating 1330 may include multiplexed VBGs as described above.

Second grating 1340 may include multiplexed VBGs or a set of transflective mirrors, and may be configured to expand the display light from first grating 1330 in a different direction (e.g., approximately the y direction) by diffracting or reflecting a portion of the display light to the eyebox each time the display light propagating within substrate 1310 reaches a transflective mirror or second grating 1340 from a certain direction. Thus, second grating 1340 may replicate the input pupil in approximately the y direction.

Figure 14:
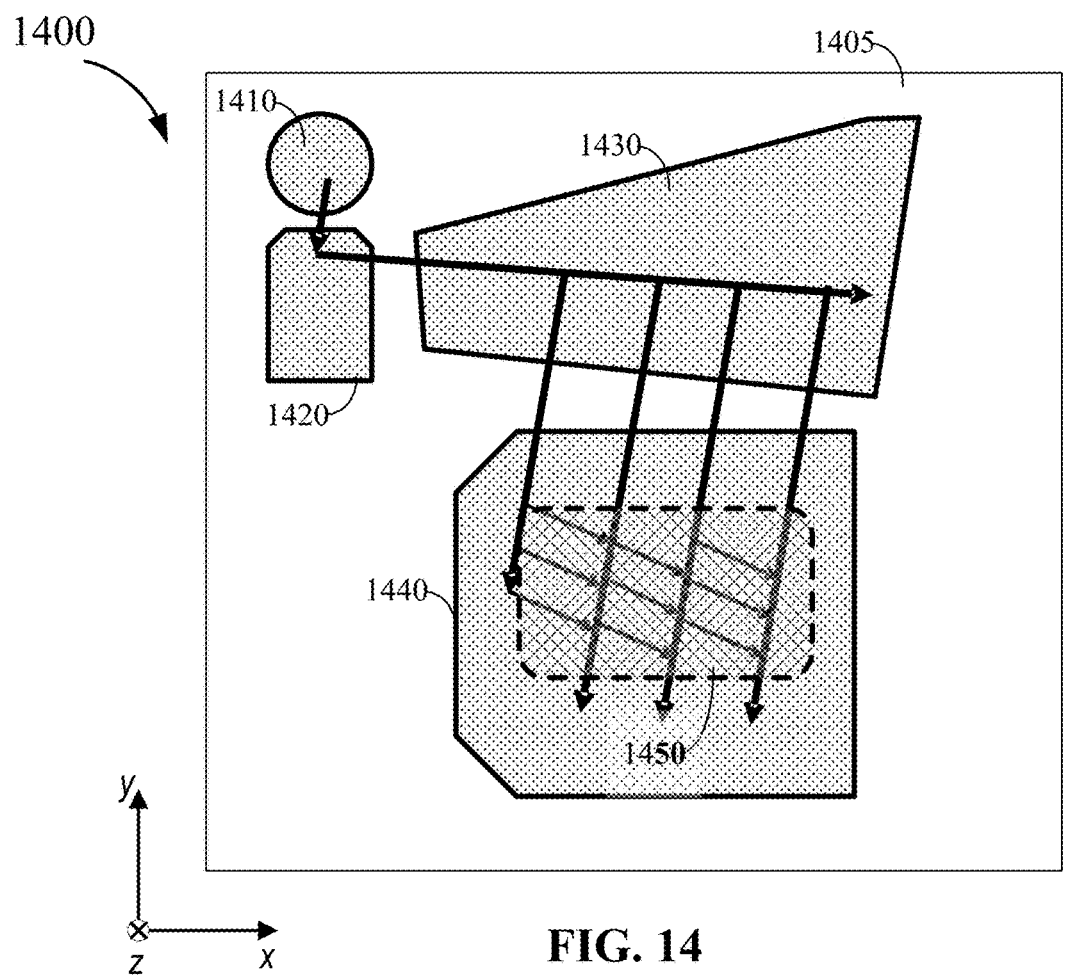
FIG. 14 illustrates another example of a waveguide display system according to certain embodiments.

FIG. 14 illustrates another example of a waveguide display system 1400 according to certain embodiments. Waveguide display system 1400 may include a waveguide 1405, and an input grating 1410, a first middle grating 1420, a second middle grating 1430, and an output grating 1440 formed on or in waveguide 1405. Each of input grating 1410, first middle grating 1420, second middle grating 1430, and output grating 1440 may be a transmissive or reflective diffraction grating or a set of one or more transflective mirrors. Display light from a light source (e.g., one or more micro-LED arrays) may be coupled into waveguide 1405 by input grating 1410. The in-coupled display light may be reflected by surfaces of waveguide 1405 through total internal reflection, such that the display light may propagate within waveguide 1405. In some embodiments, input grating 1410 may include multiplexed VBGs and may couple display light of different colors and from different fields of view into waveguide 1405 at corresponding diffraction angles. In some embodiments, input grating 1410 may include one or more mirrors with high reflectivity and may couple display light of different colors and from different fields of view into waveguide 1405.

First middle grating 1420 and second middle grating 1430 may be in different regions of a same material layer or may be on different layers. In some embodiments, first middle grating 1420 may be spatially separate from second middle grating 1430. First middle grating 1420 and second middle grating 1430 may each include multiplexed VBGs or one or more transflective mirrors. Display light coupled into waveguide 1405 by input grating 1410 may be directed to first middle grating 1420, which may redirect the display light to second middle grating 1430. Second middle grating 1430 may diffract or reflect the display light at multiple locations to direct the display light towards output grating 1440.

Output grating 1440 may be in a see-through region of waveguide display system 1400 and may include an exit region 1450 that overlaps with the eyebox of waveguide display system 1400 when viewed in the z direction (e.g., at a distance about 15-20 mm from output grating 1440 in +z or −z direction). Output grating 1440 may include multiplexed VBGs or transflective mirrors, and may diffract or reflect the display light at multiple locations to direct the display light towards the eyebox of waveguide display system 1400. As such, output grating 1440, in combination with first middle grating 1420 and second middle grating 1430, may perform the dual-axis pupil expansion to expand the incident display light beam in two dimensions to fill the eyebox with the display light.

In some embodiments, first middle grating 1420 and second middle grating 1430 may include VBGs, and each VBG in first middle grating 1420 may match a respective VBG in second middle grating 1430 (e.g., having the same grating vector in the x-y plane and having the same and/or opposite grating vector in the z direction). The two matching VBGs may work under opposite Bragg conditions (e.g., +1 order diffraction versus −1 order diffraction) due to the opposite propagation directions of the display light at the two matching VBGs. For example, as shown in FIG. 14, the VBG in first middle grating 1420 may change the propagation direction of the display light from a downward direction to a rightward direction, while the matching VBG in second middle grating 1430 may change the propagation direction of the display light from a rightward direction to a downward direction. Thus, the dispersion caused by second middle grating 1430 may be opposite to the dispersion caused by first middle grating 1420, thereby reducing or minimizing the overall dispersion.

In some embodiments, input grating 1410 and output grating may include VBGs, and each VBG in input grating 1410 may match a respective VBG in output grating 1440 (e.g., having the same grating vector in the x-y plane and having the same and/or opposite grating vector in the z direction). The two matching VBGs may also work under opposite Bragg conditions (e.g., +1 order diffraction versus −1 order diffraction) due to the opposite propagation directions of the display light (e.g., into and out of waveguide 1405) at the two matching VBGs. Therefore, the dispersion caused by input grating 1410 may be opposite to the dispersion caused by output grating 1440, thereby reducing or minimizing the overall dispersion.

Figure 15:
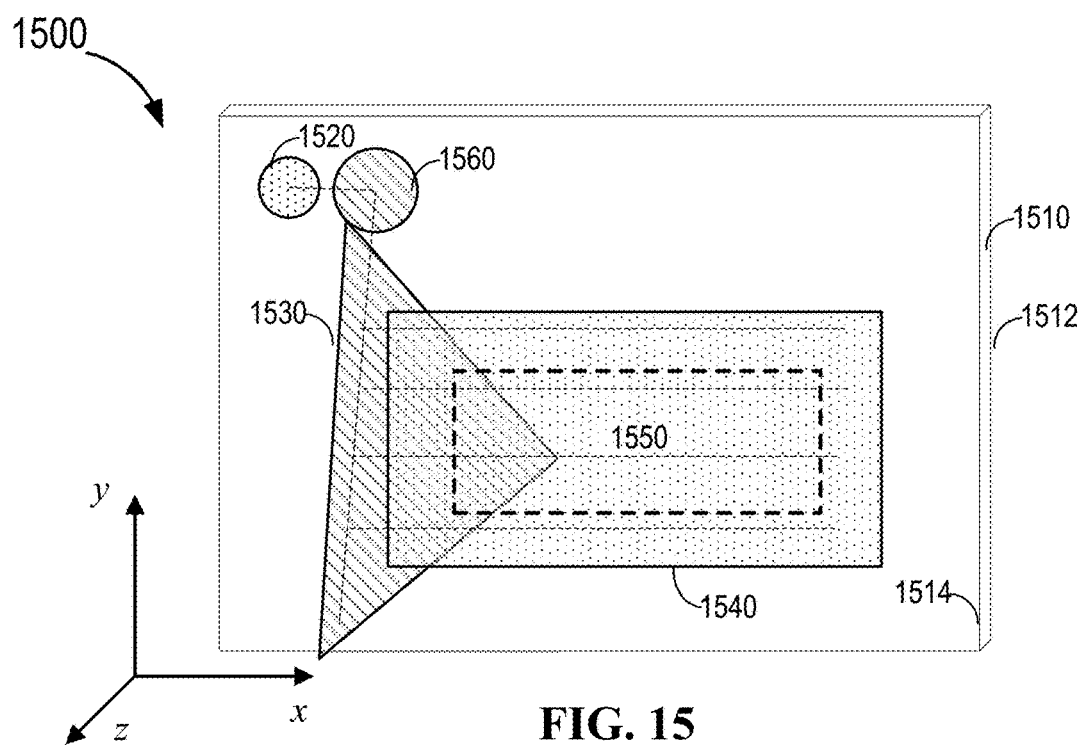
FIG. 15 illustrates yet another example of a waveguide display system according to certain embodiments.

FIG. 15 illustrates another example of a waveguide display system 1500 according to certain embodiments. Waveguide display system 1500 may include a substrate 1510, which may be similar to substrate 610. Substrate 1510 may include a first surface 1512 and a second surface 1514. Display light from a light source (e.g., LEDs) may be coupled into substrate 1510 by an input coupler 1520, and may be reflected by first surface 1512 and second surface 1514 through total internal reflection, such that the display light may propagate within substrate 1510. As described above, input coupler 1520 may include a diffractive coupler (e.g., a volume holographic grating or a surface-relief grating), a refractive coupler (e.g., a wedge or a prism), or a reflective coupler (e.g., a reflective surface having a slant angle with respect to substrate 1510).

Waveguide display system 1500 may also include a first grating 1530 and a second grating 1540 formed in substrate 1510 or on first surface 1512 and/or second surface 1514 of substrate 1510. Each of first grating 1530 and second grating 1540 may include multiplexed VBGs or transflective mirrors. In the example shown in FIG. 15, first grating 1530 and second grating 1540 may be at different regions in the x direction, and may overlap in at least a portion of the see-through region of waveguide display system 1500. First grating 1530 and second grating 1540 may be used for dual-axis pupil expansion to expand the incident display light beam in two dimensions to fill an eyebox 1550 (e.g., at a distance about 15-20 mm from second grating 1540 in +z or −z direction) with the display light. For example, first grating 1530 may expand the display light beam in approximately the y direction, while second grating 1540 may expand the display light beam in approximately the x direction.

In addition, waveguide display system 1500 may include a third grating 1560. Third grating 1560 may include VBGs or one or more mirrors. In some embodiments, third grating 1560 and first grating 1530 may be arranged at different locations in the y direction. In some embodiments, third grating 1560 and first grating 1530 may be in different regions of a same layer. In some embodiments, third grating 1560 may be spatially separate from first grating 1530. Third grating 1560 may direct display light from input coupler 1520 towards first grating 1530.

Input coupler 1520 may couple the display light from the light source into substrate 1510. The display light may propagate approximately along the x direction within substrate 1510, and may reach third grating 1560 directly or may be reflected by first surface 1512 and/or second surface 1514 to third grating 1560. Third grating 1560 may diffract or reflect the display light downward to first grating 1530. While the display light diffracted or reflected by third grating 1560 propagates within substrate 1510 along a direction (e.g., approximately in the y direction) through total internal reflection, a portion of the display light may be diffracted or reflected by first grating 1530 to second grating 1540 each time the display light propagating within substrate 1510 reaches, for example, a transflective mirror in first grating 1530. Second grating 1540 may then expand the display light from first grating 1530 in a different direction (e.g., approximately in the x direction) by diffracting or reflecting a portion of the display light to eyebox 1550 each time the display light propagating within substrate 1510 reaches (e.g., a transflective mirror of) second grating 1540.

In some embodiments, input coupler 1520 and second grating 1540 may include matching VBGs (e.g., VBGs with same grating vectors in the x-y plane and the same or opposite grating vectors in the z direction) to reduce the overall dispersion caused by input coupler 1520 and second grating 1540. In some embodiments, first grating 1530 and third grating 1560 may include matching VBGs (e.g., VBGs with same grating vectors in the x-y plane and having the same and/or opposite grating vectors in the z direction) to reduce the overall dispersion caused by gratings 1530 and 1560.

Even though only one input coupler is shown in each of FIGS. 6A, 8A, 10A, and 13-15, in some embodiments, a geometrical waveguide display system or hybrid waveguide display system disclosed herein may include two or more input couplers, where each input coupler may be configured to couple display light from a respective field of view and/or within a respective spectral range into the waveguide. The waveguide display system may also include corresponding gratings and/or transflective mirrors for dual-axis expanding of the display light coupled into the waveguide by each input coupler.

Embodiments of the invention may include or be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 16:
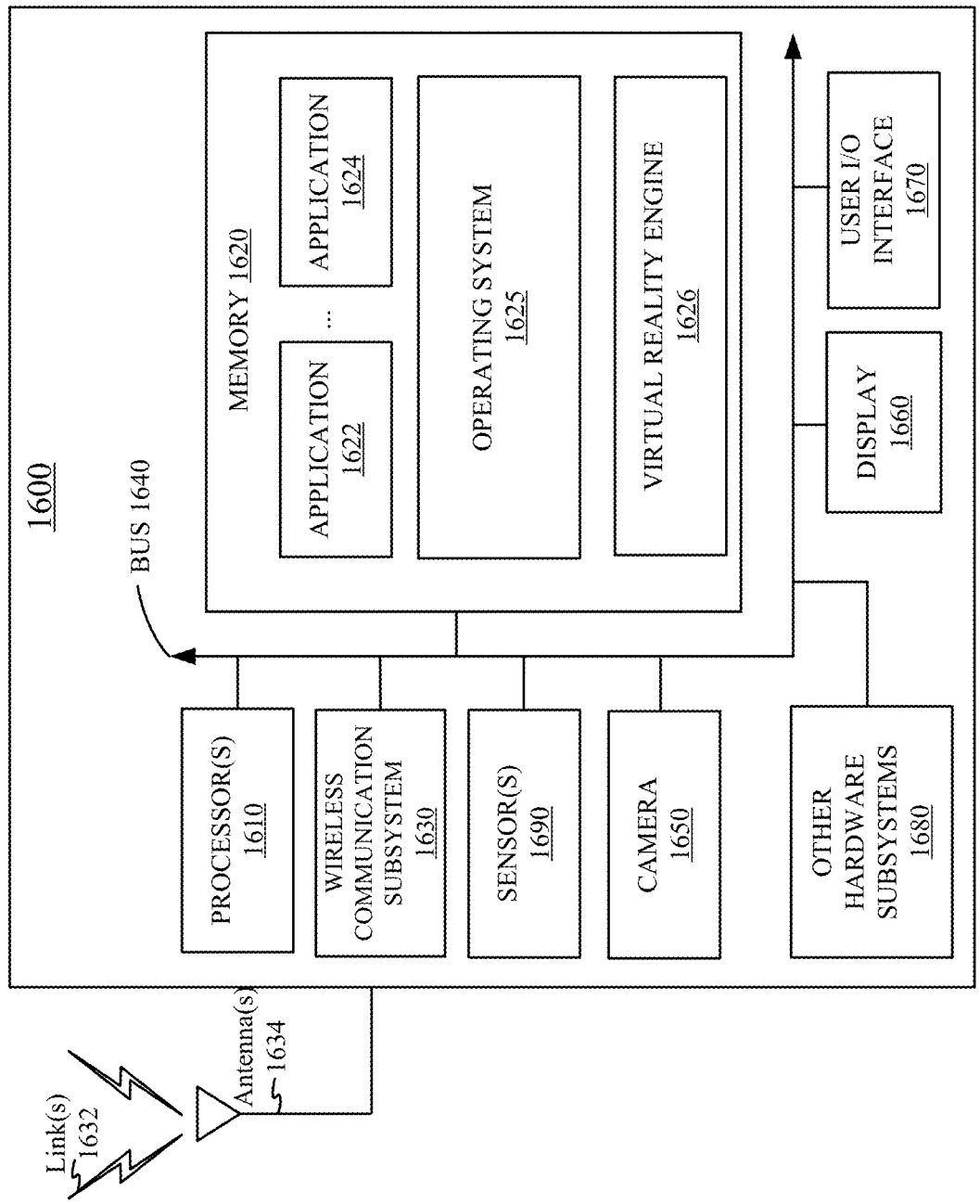
FIG. 16 is a simplified block diagram of an electronic system of an example of a near-eye display for implementing some of the examples disclosed herein.

FIG. 16 is a simplified block diagram of an electronic system 1600 of an example near-eye display (e.g., HMD device) for implementing some of the examples disclosed herein. Electronic system 1600 may be used as the electronic system of an HMD device or other near-eye displays described above. In this example, electronic system 1600 may include one or more processor(s) 1610 and a memory 1620. Processor(s) 1610 may be configured to execute instructions for performing operations at a number of components, and can be, for example, a general-purpose processor or microprocessor suitable for implementation within a portable electronic device. Processor(s) 1610 may be communicatively coupled with a plurality of components within electronic system 1600. To realize this communicative coupling, processor(s) 1610 may communicate with the other illustrated components across a bus 1640. Bus 1640 may be any subsystem adapted to transfer data within electronic system 1600. Bus 1640 may include a plurality of computer buses and additional circuitry to transfer data.

Memory 1620 may be coupled to processor(s) 1610. In some embodiments, memory 1620 may offer both short-term and long-term storage and may be divided into several units. Memory 1620 may be volatile, such as static random access memory (SRAM) and/or dynamic random access memory (DRAM) and/or non-volatile, such as read-only memory (ROM), flash memory, and the like. Furthermore, memory 1620 may include removable storage devices, such as secure digital (SD) cards. Memory 1620 may provide storage of computer-readable instructions, data structures, program code, and other data for electronic system 1600. In some embodiments, memory 1620 may be distributed into different hardware subsystems. A set of instructions and/or code might be stored on memory 1620. The instructions might take the form of executable code that may be executable by electronic system 1600, and/or might take the form of source and/or installable code, which, upon compilation and/or installation on electronic system 1600 (e.g., using any of a variety of generally available compilers, installation programs, compression/decompression utilities, etc.), may take the form of executable code.

In some embodiments, memory 1620 may store a plurality of applications 1622 through 1624, which may include any number of applications. Examples of applications may include gaming applications, conferencing applications, video playback applications, or other suitable applications. The applications may include a depth sensing function or eye tracking function. Applications 1622-1624 may include particular instructions to be executed by processor(s) 1610. In some embodiments, certain applications or parts of applications 1622-1624 may be executable by other hardware subsystems 1680. In certain embodiments, memory 1620 may additionally include secure memory, which may include additional security controls to prevent copying or other unauthorized access to secure information.

In some embodiments, memory 1620 may include an operating system 1625 loaded therein. Operating system 1625 may be operable to initiate the execution of the instructions provided by applications 1622-1624 and/or manage other hardware subsystems 1680 as well as interfaces with a wireless communication subsystem 1630 which may include one or more wireless transceivers. Operating system 1625 may be adapted to perform other operations across the components of electronic system 1600 including threading, resource management, data storage control and other similar functionality.

Wireless communication subsystem 1630 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 1600 may include one or more antennas 1634 for wireless communication as part of wireless communication subsystem 1630 or as a separate component coupled to any portion of the system. Depending on desired functionality, wireless communication subsystem 1630 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 1630 may permit data to be exchanged with a network, other computer systems, and/or any other devices described herein. Wireless communication subsystem 1630 may include a means for transmitting or receiving data, such as identifiers of HMD devices, position data, a geographic map, a heat map, photos, or videos, using antenna(s) 1634 and wireless link(s) 1632.

Embodiments of electronic system 1600 may also include one or more sensors 1690. Sensor(s) 1690 may include, for example, an image sensor, an accelerometer, a pressure sensor, a temperature sensor, a proximity sensor, a magnetometer, a gyroscope, an inertial sensor (e.g., a subsystem that combines an accelerometer and a gyroscope), an ambient light sensor, or any other similar devices or subsystems operable to provide sensory output and/or receive sensory input, such as a depth sensor or a position sensor. For example, in some implementations, sensor(s) 1690 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 1600 may include a display 1660. Display 1660 may be a near-eye display, and may graphically present information, such as images, videos, and various instructions, from electronic system 1600 to a user. Such information may be derived from one or more applications 1622-1624, virtual reality engine 1626, one or more other hardware subsystems 1680, a combination thereof, or any other suitable means for resolving graphical content for the user (e.g., by operating system 1625). Display 1660 may use liquid crystal display (LCD) technology, light-emitting diode (LED) technology (including, for example, OLED, ILED, µLED, AMOLED, TOLED, etc.), light emitting polymer display (LPD) technology, or some other display technology.

Electronic system 1600 may include a user input/output interface 1670. User input/output interface 1670 may allow a user to send action requests to electronic system 1600. An action request may be a request to perform a particular action. For example, an action request may be to start or end an application or to perform a particular action within the application. User input/output interface 1670 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 1600. In some embodiments, user input/output interface 1670 may provide haptic feedback to the user in accordance with instructions received from electronic system 1600. For example, the haptic feedback may be provided when an action request is received or has been performed.

Electronic system 1600 may include a camera 1650 that may be used to take photos or videos of a user, for example, for tracking the user's eye position. Camera 1650 may also be used to take photos or videos of the environment, for example, for VR, AR, or MR applications. Camera 1650 may include, for example, a complementary metal-oxide-semiconductor (CMOS) image sensor with a few millions or tens of millions of pixels. In some implementations, camera 1650 may include two or more cameras that may be used to capture 3-D images.

In some embodiments, electronic system 1600 may include a plurality of other hardware subsystems 1680. Each of other hardware subsystems 1680 may be a physical subsystem within electronic system 1600. While each of other hardware subsystems 1680 may be permanently configured as a structure, some of other hardware subsystems 1680 may be temporarily configured to perform specific functions or temporarily activated. Examples of other hardware subsystems 1680 may include, for example, an audio output and/or input interface (e.g., a microphone or speaker), a near field communication (NFC) device, a rechargeable battery, a battery management system, a wired/wireless battery charging system, etc. In some embodiments, one or more functions of other hardware subsystems 1680 may be implemented in software.

In some embodiments, memory 1620 of electronic system 1600 may also store a virtual reality engine 1626. Virtual reality engine 1626 may execute applications within electronic system 1600 and receive position information, acceleration information, velocity information, predicted future positions, or some combination thereof of the HMD device from the various sensors. In some embodiments, the information received by virtual reality engine 1626 may be used for producing a signal (e.g., display instructions) to display 1660. For example, if the received information indicates that the user has looked to the left, virtual reality engine 1626 may generate content for the HMD device that mirrors the user's movement in a virtual environment. Additionally, virtual reality engine 1626 may perform an action within an application in response to an action request received from user input/output interface 1670 and provide feedback to the user. The provided feedback may be visual, audible, or haptic feedback. In some implementations, processor(s) 1610 may include one or more GPUs that may execute virtual reality engine 1626.

In various implementations, the above-described hardware and subsystems may be implemented on a single device or on multiple devices that can communicate with one another using wired or wireless connections. For example, in some implementations, some components or subsystems, such as GPUs, virtual reality engine 1626, and applications (e.g., tracking application), may be implemented on a console separate from the head-mounted display device. In some implementations, one console may be connected to or support more than one HMD.

In alternative configurations, different and/or additional components may be included in electronic system 1600. Similarly, functionality of one or more of the components can be distributed among the components in a manner different from the manner described above. For example, in some embodiments, electronic system 1600 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium," as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean A, B, C, or a combination of A, B, and/or C, such as AB, AC, BC, AA, ABC, AAB, ACC, AABBCCC, or the like.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components, or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A waveguide display system comprising:
   a waveguide;
   an input coupler configured to couple display light into the waveguide;
   a first pupil expander; and
   a second pupil expander,
   wherein the first pupil expander is configured to deflect, at a first plurality of locations along a first direction, the display light towards the second pupil expander,
   wherein the second pupil expander is configured to deflect, at a second plurality of locations along a second direction different from the first direction, the display light from the first pupil expander towards an eyebox of the waveguide display system, and
   wherein at least one of the first pupil expander or the second pupil expander includes transflective mirrors that are tilted within the waveguide such that the transflective mirrors are inconspicuous when viewed from an oblique angle.

2. The waveguide display system of claim 1, wherein the first pupil expander includes transflective mirrors that are tilted within the waveguide at an angle between 40° and 60° with respect to a broadside surface of the waveguide.

3. The waveguide display system of claim 1, wherein the second pupil expander includes transflective mirrors that are tilted within the waveguide at an angle between 25° and 35° with respect to a broadside surface of the waveguide.

4. The waveguide display system of claim 1, wherein the transflective mirrors are characterized by different respective reflection efficiencies.

5. The waveguide display system of claim 1, wherein at least one of the input coupler, the first pupil expander, or the second pupil expander includes multiplexed volume Bragg gratings.

6. The waveguide display system of claim 5, wherein the multiplexed volume Bragg gratings include reflective diffraction gratings or transmissive diffraction gratings.

7. The waveguide display system of claim 1, wherein the input coupler includes a volume Bragg grating, a surface-relief grating, a prism, or a reflective surface.

8. The waveguide display system of claim 1, wherein each transflective mirror of the transflective mirrors includes a plurality of dielectric coating layers.

9. The waveguide display system of claim 1, wherein a width of a light beam reflected by each transflective mirror of the transflective mirrors is larger than a half of a thickness of the waveguide.

10. The waveguide display system of claim 1, wherein each transflective mirror of the transflective mirrors is characterized by a full-width half-magnitude (FWHM) reflection angular range greater than 40°.

11. The waveguide display system of claim 1, wherein at least one transflective mirror of the transflective mirrors is characterized by a reflectivity greater than 50%.

12. The waveguide display system of claim 1, wherein:
    the input coupler includes a first volume Bragg grating characterized by a first grating vector;
    the second pupil expander includes a second volume Bragg grating characterized by a second grating vector; and
    the first grating vector and the second grating vector have a same component in a plane parallel to a broadside surface of the waveguide.

13. The waveguide display system of claim 1, wherein the first pupil expander and the second pupil expander at least partially overlap when viewed in a surface normal direction of the waveguide.

14. The waveguide display system of claim 1, further comprising a deflector configured to deflect the display light from the input coupler towards the first pupil expander.

15. The waveguide display system of claim 14, wherein:
    the deflector includes a first group of one or more reflective and/or transflective mirrors having a first orientation; and
    the first pupil expander includes a second group of one or more reflective and/or transflective mirrors having the first orientation.

16. The waveguide display system of claim 1, wherein:
    the input coupler includes a first group of one or more reflective and/or transflective mirrors having a first orientation; and
    the second pupil expander includes a second group of one or more reflective and/or transflective mirrors having the first orientation.

17. A near-eye display system comprising:
    a waveguide transparent to display light;
    an input coupler configured to couple the display light into the waveguide, the input coupler including a first group of one or more reflective and/or transflective mirrors having a first orientation;
    a first pupil expander; and
    a second pupil expander,
    wherein the first pupil expander is configured to deflect, at a first plurality of locations along a first direction, the display light from the input coupler towards the second pupil expander, the first pupil expander including a second group of one or more reflective and/or transflective mirrors having a second orientation; and
    wherein the second pupil expander is configured to deflect, at a second plurality of locations along a second direction different from the first direction, the display light from the first pupil expander towards an eyebox of the near-eye display system, the second pupil expander including a third group of one or more reflective and/or transflective mirrors having the first orientation.

* * * * *